US006456845B1

(12) United States Patent
Drum et al.

(10) Patent No.: US 6,456,845 B1
(45) Date of Patent: Sep. 24, 2002

(54) METHODS AND SYSTEMS FOR OBSERVING, ANALYZING AND CORRELATING MULTI-PROTOCOL SIGNALING MESSAGE TRAFFIC IN A MOBILE TELECOMMUNICATIONS NETWORK

(75) Inventors: Michael John Drum; Patrick Joseph Galizia, both of Cary; Peter Joseph Marsico, Carrboro, all of NC (US)

(73) Assignee: Tekelec, Calabasas, CA (US)

( * ) Notice: Subject to any disclaimer, the term of this patent is extended or adjusted under 35 U.S.C. 154(b) by 0 days.

(21) Appl. No.: 09/698,857

(22) Filed: Oct. 27, 2000

Related U.S. Application Data

(60) Provisional application No. 60/171,009, filed on Dec. 15, 1999.

(51) Int. Cl.[7] ............................................... H04Q 7/20
(52) U.S. Cl. ...................... 455/424; 455/403; 455/67.1; 455/560
(58) Field of Search ................................ 455/406, 408, 455/67.1, 560, 424, 403; 370/352, 353, 467, 355, 356, 354

(56) References Cited

U.S. PATENT DOCUMENTS

| | | | |
|---|---|---|---|
| 5,793,752 A | * 8/1998 | Clarke et al. ............... | 370/252 |
| 6,009,321 A | 12/1999 | Wang et al. | |
| 6,088,587 A | * 7/2000 | Abbadessa .................. | 455/424 |
| 6,091,950 A | 7/2000 | Remy | |
| 6,108,782 A | 8/2000 | Fletcher et al. | |
| 6,137,876 A | 10/2000 | Wong et al. | |

FOREIGN PATENT DOCUMENTS

| | | |
|---|---|---|
| EP | 0805609 A2 | 11/1997 |
| EP | 0991251 A2 | 4/2000 |
| EP | 1041830 A1 | 10/2000 |

OTHER PUBLICATIONS

Ferrel G. Stremler, *Introduction to Communication Systems*, Third edition 1990, pp. 120–121, 188–189, Addison–Wesley Publishing Company, Inc., USA.

Ming–Chwan Chow, *Understanding Wireless Digital Mobile, Cellular and PCS*, 1998, pp. 2–26 to 2–34, 7–20 to 7–22, 7–25 to 7–26, 7–32 to 7–37, 7–50 to 7–53, Andan Publisher, Holmdel, New Jersey, USA.

Franklin H. Blecher, "Advanced Mobile Phone Service", *IEEE Transactions on Vehicular Technology*, vol. VT–29, No. 2, May 1980, pp. 238–244.

\* cited by examiner

*Primary Examiner*—Daniel Hunter
*Assistant Examiner*—Lana Le
(74) *Attorney, Agent, or Firm*—Jenkins & Wilson, P.A.

(57) ABSTRACT

A wireless communication network monitoring system for use in performing a user specified trace of signaling messages associated with a mobile call is disclosed. A central processing platform creates and distributes signaling message filter criteria information to a plurality of link monitoring modules (LMM). The filter criteria are asserted at a LMM and a matching signaling message is copied and subsequently transmitted to the central processing platform. Central processing platform receives the matching signaling message and uses information contained therein to create and distribute a second signaling message filter criteria. In such a manner, a call trace sequence is compiled and displayed. A billing subsystem is also disclosed and is adapted to generate a billing record based on information contained with one or more of the messages associated with the call trace sequence.

55 Claims, 15 Drawing Sheets

Inter-Message Parameter Matching Rules

| TRACE SEQUENCE | MESSAGE TYPE | PARAMETER | MESSAGE TYPE | PARAMETER |
|---|---|---|---|---|
| 1 | DTAP | Called No. | | |
| 2 | BSSMAP | SLRN | DTAP | DLRN |
| 3 | DTAP | Called No. | MAP | MSISDN |
| 4 | MAP | Trans. ID | MAP | Trans. ID |
| 5 | MAP | IMSI | BSSMAP | Mobile ID |
| 6 | BSSMAP | TMSI | DTAP | TMSI |
| 7 | DTAP | SLRN | DTAP | DLRN |

BILLING RULES

| RULE | MESSAGE TYPE | PARAMETER | VALUE | BILLING RATE |
|---|---|---|---|---|
| 1 | DTAP | Called No. | 9195551212 | $0.05 |
| 2 | Any | Called No. | 9194605500 | $0.07 |
| 3 | Any | Calling No. | 919462* | $0.04 |
| 4 | MAP | IMSI | 919* | $0.25 |
| 5 | MAP | PC/SSN | 2-1-0/32 | $0.25 |

*FIG. 11*

METHODS AND SYSTEMS FOR OBSERVING, ANALYZING AND CORRELATING MULTI-PROTOCOL SIGNALING MESSAGE TRAFFIC IN A MOBILE TELECOMMUNICATIONS NETWORK

RELATED APPLICATIONS

This application claims the benefit of United States Provisional Patent Application No. 60/171,009, filed Dec. 15, 1999, the disclosure of which is incorporated herein by reference in its entirety.

TECHNICAL FIELD

The present invention relates to the monitoring of call signaling in a telecommunications network, and more particularly to methods and systems for observing, analyzing and correlating a sequence of call signaling messages associated with a particular mobile call whereby information contained in one monitored signaling message is used to locate another signaling message in the call trace sequence.

BACKGROUND ART

A typical wireless or cellular telecommunications network, generally indicated by the numeral 100, is illustrated in FIG. 1. More particularly, the wireless communication network 100 presented in FIG. 1 is an example of simplified global system for mobile communication (GSM)-type network. Sample GSM network 100 includes a telecommunication terminal or telephone handset 102, a base station system (BSS) 104, a mobile switching center (MSC) 106, a home location register (HLR) 108, and an authentication center (AuC) 110.

Mobile switching center (MSC) 106 is the functional entity that represents an automatic packet switching system within a wireless communication network. When such a packet switching system is implemented so as to serve as the interface for user traffic between the cellular network and other public switched networks, the corresponding node is often referred to as a Gateway MSC or GMSC. In general, MSC 106 provides basic switching functionality and coordinates the establishment of calls between wireless end users. An MSC is directly responsible for transmission facilities management, mobility management, and call processing functions. An MSC node is typically in communication with the air-interface components of a wireless network (i.e., base station systems) as well as with other voice and signaling related nodes in the wireless network. As such, an MSC incorporates switching functions, mobile application functions, and other service logic functions in a wireless communications network.

Home location register (HLR) 108 is the functional entity that represents the primary database repository of subscriber information used to provide control and intelligence in wireless communication networks. The term register denotes control and processing center functions as well as the database functions. An HLR is managed by the wireless service provider and represents the "home" database for subscribers who have subscribed to service in a particular geographic area. An HLR contains a record for each "home" subscriber that includes location information, subscriber status, subscribed features, and directory numbers. Supplementary services or features that are provided to a subscriber are ultimately controlled by an HLR. HLR nodes typically incorporate database functions, mobile application functions, as well as other service logic functions, and may service one or more MSCs.

Authentication center (AuC) 110 is the functional entity that represents the authentication functions used to verify and validate a mobile subscriber's identity. An AuC node manages and processes authentication information related to a particular mobile subscriber. Typically, this information consists of encryption and authentication keys as well as complex mathematical algorithms used to prevent fraudulent or unauthorized use of the wireless network. An AuC incorporates database functions used for the authentication keys and authentication algorithm functions.

Those skilled in the art of GSM communication networking will appreciate that the network elements described above represent only a few of the network entities that are commonly deployed in a GSM network. It will also be appreciated that such GSM-type network elements are communicatively coupled via a variety of communication link types, which in turn may employ a variety of signaling application and transport protocol suites. As illustrated in FIG. 1, BSS 104 is communicatively coupled to GMSC node 106, while GMSC node 106 is further coupled to both HLR node 108 and AuC node 110.

The establishment and maintenance of a call to or from mobile handset 102 typically involves the use of a number of signaling messages that are communicated between various network entities that comprise the GSM network 100. For instance, BSS 104 communicates with GMSC node 106 using both direct transfer application protocol (DTAP) and base station system management application protocol (BSSMAP) signaling protocol messages which may be transmitted over inter-connecting communication links using a transport protocol suite such as the signaling system 7 (SS7) message transfer part (MTP) protocol. GMSC 106, in turn, communicates with HLR node 108 and AuC node 110 using mobile application part (MAP) signaling protocol messages which may also be transmitted over signaling links using an SS7 MTP transport protocol suite.

Also shown in FIG. 1 is a network monitoring system that includes a central monitoring platform 112 which is connected to communication link probes 114, 116 and 118. More particularly, link probe 114 is adapted to monitor both DTAP and BSSMAP signaling messages communicated between BSS 104 and GMSC 106, sending copies of the DTAP and BSSMAP messages to monitoring platform 112 for analysis and display. Link probe 116 is adapted to monitor the MAP signaling message traffic flowing between GMSC node 106 and HLR node 108, and again sends copies of the monitored messages to platform 112 for analysis and display. In a similar manner, link probe 116 is adapted to monitor the MAP signaling message traffic flowing between GMSC node 106 and AuC node 110, sending copies of the MAP messages to monitoring platform 112 for analysis and display.

As indicated in FIG. 1, the above described wireless network elements function together in concert to provide the intelligent network services typically associated with modern wireless telecommunication networks. As such, inter-communication between these network elements is a very important issue, and is facilitated at least in part by signaling communication links. Currently, the trend within the United States wireless telecommunications industry is towards a signaling infrastructure based on the SS7 and IS-41 protocols. In many countries outside of the United States, a signaling protocol known as global system for mobile communications (GSM) is often employed in wireless communication networks. These two signaling protocols are similar in many respects, and consequently discussions of signaling type communications in this disclosure will be limited to those based on the GSM protocol. It will be appreciated that the present invention, described herein, can be successfully deployed in GSM, Personal Communication Services (PCS) and IS-41-based signaling networks.

Signaling in a wireless or cellular network is employed to implement a number of call processing operations. The term call processing encompasses a wide variety of functions that establish, maintain, and tear down calls to and from mobile subscribers (where a call is defined as a temporary communication between end users for the purpose of exchanging information). Mobile calls include a sequence of events that allocate and assign the resources and signaling channels required to establish build a communication connection. In general terms, the act of call establishment or call setup in a wireless communications network comprises a set of discrete signaling operations that arrange for the allocation and engagement of network resources required for the connection of a mobile call.

In addition to providing the infrastructure for basic call setup and teardown operations as mentioned above, wireless signaling is also responsible for providing general mobility management services. Such services enable a communications network to maintain location and mobile subscriber status information so that end users can make and receive mobile-originated and mobile-terminated calls while moving or roaming from geographic location to another.

The establishment of a mobile call may involve both GSM and Signaling System 7 (SS7) ISDN User Part (ISUP) call control signaling to properly connect the called and calling parties. GSM call signaling is used to obtain the location, status, routing, and any special call treatment information about a mobile subscriber to properly complete mobile-terminated calls. It is also used to obtain call treatment and routing information for mobile-originated calls. This signaling is provided by the GSM intersystem operations. With regard to intersystem handoff, GSM signaling is also used to control the allocation and engagement of inter-MSC voice trunks. A more detailed discussion of GSM and IS-41 mobile signaling can be found in *Mobile Telecommunications Networking With IS*-41 by Michael D. Gallagher and Randall A. Snyder, McGraw-Hill Publishing 1997 and *Signaling System #7* by Travis Russell, McGraw-Hill Publishing 1998.

The brief discussion presented above illustrates the important role of mobile call signaling operations in a wireless communications network and highlights the need for network operators to have the capability of viewing a comprehensive listing of all signaling message traffic associated with a particular mobile call. Such information is particularly useful for troubleshooting, network planning, and billing operations. Previous network monitoring systems, such as monitoring system 112 shown in FIG. 1, have been capable of simultaneously monitoring multiple communication links, where the mobile signaling messages carried on these links are formatted in a variety of signaling protocols. However, automatic correlation of signaling messages generated and communicated between a BSS air-interface and an MSC (e.g., DTAP and BSSMAP) with those signaling messages typically associated with the SS7 protocol (e.g., ISUP, TCAP and MAP) has not previously been available. Those skilled in the art of wireless telecommunication systems will appreciate that the internal structures and parameter contents of BSSMAP, DTAP, ISUP, TCAP and MAP mobile signaling messages differ considerably.

As generally indicated in FIG. 2, the internal structure and parameter content differences primarily exist at a level in the overall protocol stack that is above the MTP transport protocol layer(s). More particularly, shown in FIG. 2 is a typical mobile application part (MAP) message structure 120, a typical ISDN user part (ISUP) message structure 140, a typical DTAP message structure 150, and a typical BSS-MAP message structure 160. In these sample structures, it is assumed that each message utilizes an MTP transport protocol which is comprised of an MTP 1 level 122, an MTP 2 level 124, and an MTP 3 level 126. These three MTP levels generally correspond to the physical, data link and network levels, respectively, in the open systems integration (OSI) model developed by the International Standards Organization (ISO). The MTP levels are charged with providing the upper levels of each protocol stack with node-to-node transmission capability, basic error detection/correction capabilities, message sequencing, message routing, message discrimination, and message distribution functionality.

In addition to the MTP layers described above, MAP structure 120 further includes a signaling connection control part (SCCP) level 128, a transaction capabilities application part (TCAP) level 130, and a mobile application part (MAP) level 132. In a similar manner, ISUP structure 140 further includes an ISDN user part (ISUP) level 142. DTAP structure 150 further includes an SCCP level 128, as well as a DTAP level 152. Likewise, BSSMAP structure 162 includes an SCCP level 128, and a BSSMAP level 162. It will be appreciated by those skilled in the art of wireless telecommunication networking that a single mobile call attempt can, and often does, result in the generation of a plurality of messages that are representative of all of the above described mobile signaling message types.

With particular regard to the TCAP level 130, MAP level 132, ISUP level 142, DTAP level 152, and BSSMAP level 162, it will be appreciated that the structure and parameter contents within these levels differ significantly. Consequently, a specific parameter contained in one message type may not necessarily be contained in the structure of another message type. For example, a BSSMAP message associated with a particular mobile call includes a TMSI parameter, while a MAP message associated with the same mobile call does not include a TMSI parameter. This lack of parameter uniformity among mobile signaling message types, combined with the fact that there is not a unique mobile call ID value assigned to each mobile call and subsequently contained in every signaling message associated with that mobile call, makes a complete and comprehensive correlation of all mobile call signaling messages difficult.

Therefore, what is needed is a network monitoring system that is capable of simultaneously monitoring a plurality of communication links in a wireless communications network, including air-interface to MSC links, and automatically correlating and displaying all signaling messages associated with a mobile call.

DISCLOSURE OF THE INVENTION

According to one aspect, the present invention includes a network monitoring system that is capable of simultaneously monitoring a plurality of signaling communication links in a wireless communication network, including air-interface to mobile switching center (MSC) signaling links. The monitoring system is further adapted to automatically correlate all messages associated with a specific call, including related signaling messages observed on an air-interface to MSC communication link. Consequently, a complete and comprehensive record of all relevant signaling messages associated with a specific call is automatically presented to the monitoring system user.

In one embodiment, a network monitoring system of the present invention is adapted to simultaneously monitor a plurality of signaling communication links in a global system for mobile communication (GSM) wireless telecommunications network. As such, the network monitoring system observes and automatically correlates signaling messages associated with a particular user specified call, where the signaling messages are formatted in a variety of different signaling protocols. Such GSM signaling protocols include, but are not limited to base station system management application part (BSSMAP), direct transfer application part (DTAP), mobile application part (MAP), ISDN user part (ISUP), and transaction capabilities application part (TCAP). In a closely related embodiment of the present invention, a network monitoring system is adapted to perform a similar function within an ANSI IS-41 or Personal Communication Services (PCS) type wireless networks.

A network monitoring system of the present invention includes a plurality of communication probes that are adapted to provide non-intrusive monitoring of the signaling communication links to which they are connected. Each communication link probe is communicatively coupled to a central monitoring platform, where collection and correlation processing is performed. The monitoring platform may also implement a user interface for managing any required input/output (I/O) operations. As such, via the user interface a user may specify one or more parameters identifying a particular call or set of calls to be examined. With the necessary call parameters specified, the network monitoring system is adapted to automatically collect, correlate and display all signaling messages indicated by the specified call parameters. Such functionality allows a complete and comprehensive call trace to be automatically performed and displayed, where the results of the trace include relevant signaling messages collected from all monitored communication links.

It is of particular significance that the automatically generated call trace output produced by the network monitoring system of the present invention includes call signaling messages that are communicated between an air-interface or base station system (BSS) and an associated mobile switching center (MSC).

It is also significant that the network monitoring system of the present invention does not require that all signaling message traffic on a signaling link during a given time interval be reported to a central processing platform in order to perform a call trace operation. Instead a network monitoring system of the present invention employs a pre-determined sequence of signaling message filter criteria which are selectively downloaded to a plurality of link monitoring modules, so as to effectively use information contained in a first located signaling message associated with a call trace to search for a second signaling message associated with the same call trace.

Accordingly, it is an object of the present invention to provide a network monitoring system that is capable of simultaneously monitoring a plurality of GSM signaling communication links, including a BSS to MSC signaling communication link, and automatically correlating all signaling messages associated with a user specified call or calls.

It is another object of the present invention to provide a monitoring system for automatically generating and displaying correlated call trace information associated with a specific call or set of calls in a GSM wireless telecommunication network.

It is another object of the present invention to provide a monitoring system for automatically generating and displaying correlated call trace information associated with a specific call or set of calls in an ANSI IS-41 wireless telecommunication network.

It is another object of the present invention to provide a monitoring system for automatically generating and displaying correlated call trace information associated with a specific call or set of calls in a PCS wireless telecommunication network.

It is another object of the present invention to provide a monitoring system that facilitates independent dynamic filtering of signaling message traffic at each signaling link monitoring module or probe.

It is another object of the present invention to provide a monitoring system that does not require that all signaling message traffic on a signaling link during a given time interval be reported to a central correlating platform in order to perform a call trace operation.

It is another object of the present invention to provide a monitoring system that employs a pre-determined sequence of signaling message filter criteria, so as to effectively use information contained in a first located signaling message associated with a call trace to search for a second signaling message associated with the same call trace.

Some of the objects of the invention having been stated hereinabove, other objects will become evident as the description proceeds, when taken in connection with the accompanying drawings as best described hereinbelow.

BRIEF DESCRIPTION OF THE DRAWINGS

Preferred embodiments of the invention will now be explained with reference to the accompanying drawings, of which:

FIG. 5 is a table illustrating a sample set of inter-message parameter matching rules.

FIG. 11 illustrates an exemplary billing rate database used by the billing process illustrated in FIG. 10.

DETAILED DESCRIPTION OF THE INVENTION

Figure 3:
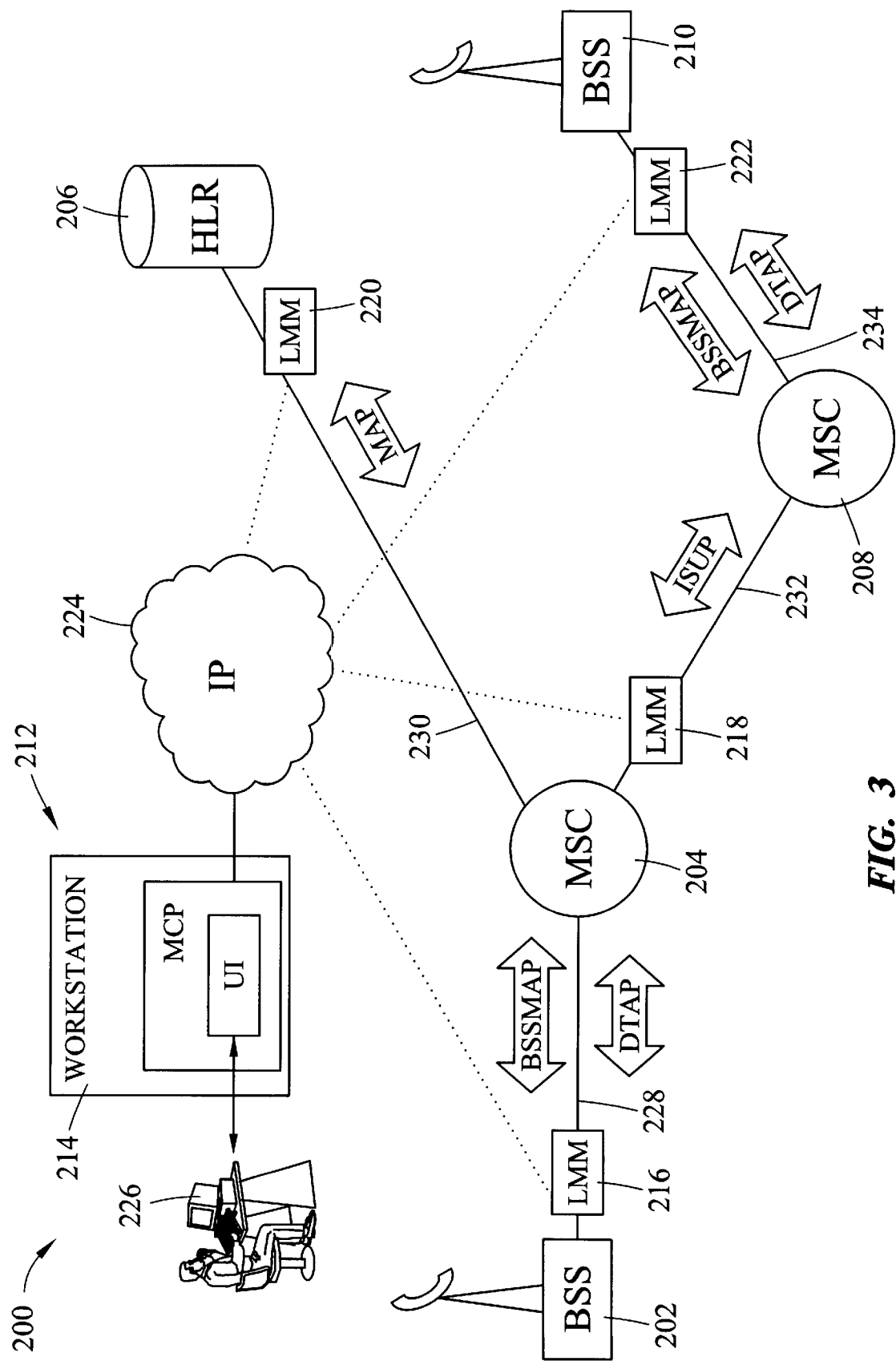
FIG. 3 is a network diagram illustrating an implementation of a network monitoring system of the present invention in a global system for mobile communication (GSM) network.

Shown in FIG. 3 is a simplified global system for mobile communication (GSM) network, generally indicated by the numeral 200. GSM network 200 includes a first base station transceiver system (BSS) 202, a first mobile switching center 204, a home location register (HLR) 206, a second MSC 208, and a second BSS 210. Also included in FIG. 3 is a network monitoring system of the present invention, generally indicated by the numeral 212. Network monitoring system 212 is comprised of a central message correlating or processing platform 214, and a plurality of associated communication link probes. More specifically, in the example shown in FIG. 3, network monitoring system 212 includes a first link monitoring module (LMM) 216, a second LMM 218, a third LMM 220, and a fourth LMM 222. Each LMM is communicatively coupled to the central message correlating platform 214 via an Internet protocol (IP) communication network 224. The central message correlating platform 214 is adapted to provide a user 226 with an interface (UI) such that the user may enter monitoring and correlating instructions and observe the subsequent results.

As further indicated in FIG. 3, simplified GSM network 200 includes a plurality of signaling links, with each link effectively communicatively coupling a pair of network nodes. More particularly, signaling link 228 is adapted to carry signaling messages between BSS 202 and MSC 204. It will be appreciated from FIG. 3 that the signaling protocols supported on link 228 include base station system management application part (BSSMAP) and direct transfer application part (DTAP). Those skilled in the art of wireless network communication will appreciate that BSSMAP and DTAP protocol signaling messages are transmitted and received only between BSS and MSC type network elements. Signaling link 230 is adapted to carry signaling messages between MSC 204 and HLR 206. Again, it will be appreciated from FIG. 3 that the signaling protocols supported on link 230 include mobile application part (MAP). Signaling link 232 is adapted to support the transmission of ISUP type signaling messages between MSC 204 and MSC 208. Signaling link 234 is adapted to carry signaling messages between MSC 208 and BSS 210. As with link 228, the signaling protocols supported on link 234 include BSSMAP and DTAP.

It will be appreciated by those skilled in the art of wireless telecommunication networks that the GSM network 200 is a highly simplified example of typical GSM network architectures, and is intended to merely illustrate the basic functionality of a monitoring system of the present invention. Significantly more complex architectures would typically be employed in a fully deployed and operating GSM network. However, it should also be appreciated that a network monitoring system of the present invention could be deployed and would function similarly in such complex architectures.

Figure 4:
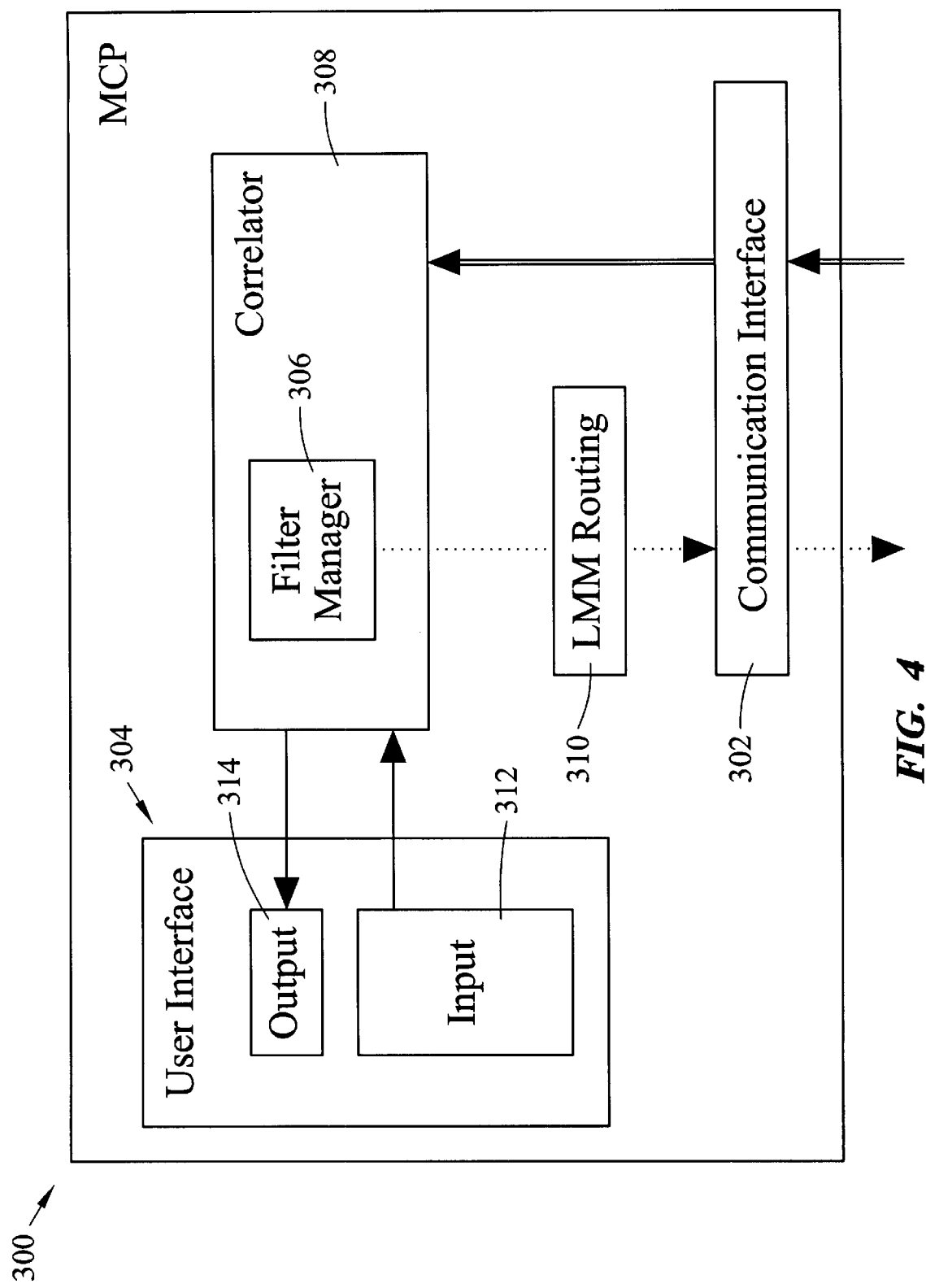
FIG. 4 is a diagram of a message correlating and processing platform according to an embodiment of the present invention.

Shown in FIG. 4 is a message correlating platform (MCP), generally indicated by the numeral 300, that includes a communication interface 302, a user interface process 304, a filter manager process 306 that is included within a message correlator process 308, and a LMM routing process 310. User interface process 304 further includes an input process 312 and an output process 314. In general, user interface 304 is adapted to provide a human operator or user with a means to input monitoring instructions and to subsequently view the correlated monitoring results. In one embodiment, a user is permitted to specify, via input process 312, a set of filter criteria that correspond to particular values or ranges of values of various parameters contained with the types of signaling messages that are to be observed or monitored. Input process 312 may assume the form of a graphical user interface (GUI) or a text-based command line type interface. In a similar manner, output process 314 provides a user with a means to view and interpret the results of a monitoring session, and may assume the form of a graphical user interface (GUI) or a text-based interface.

Figure 1:
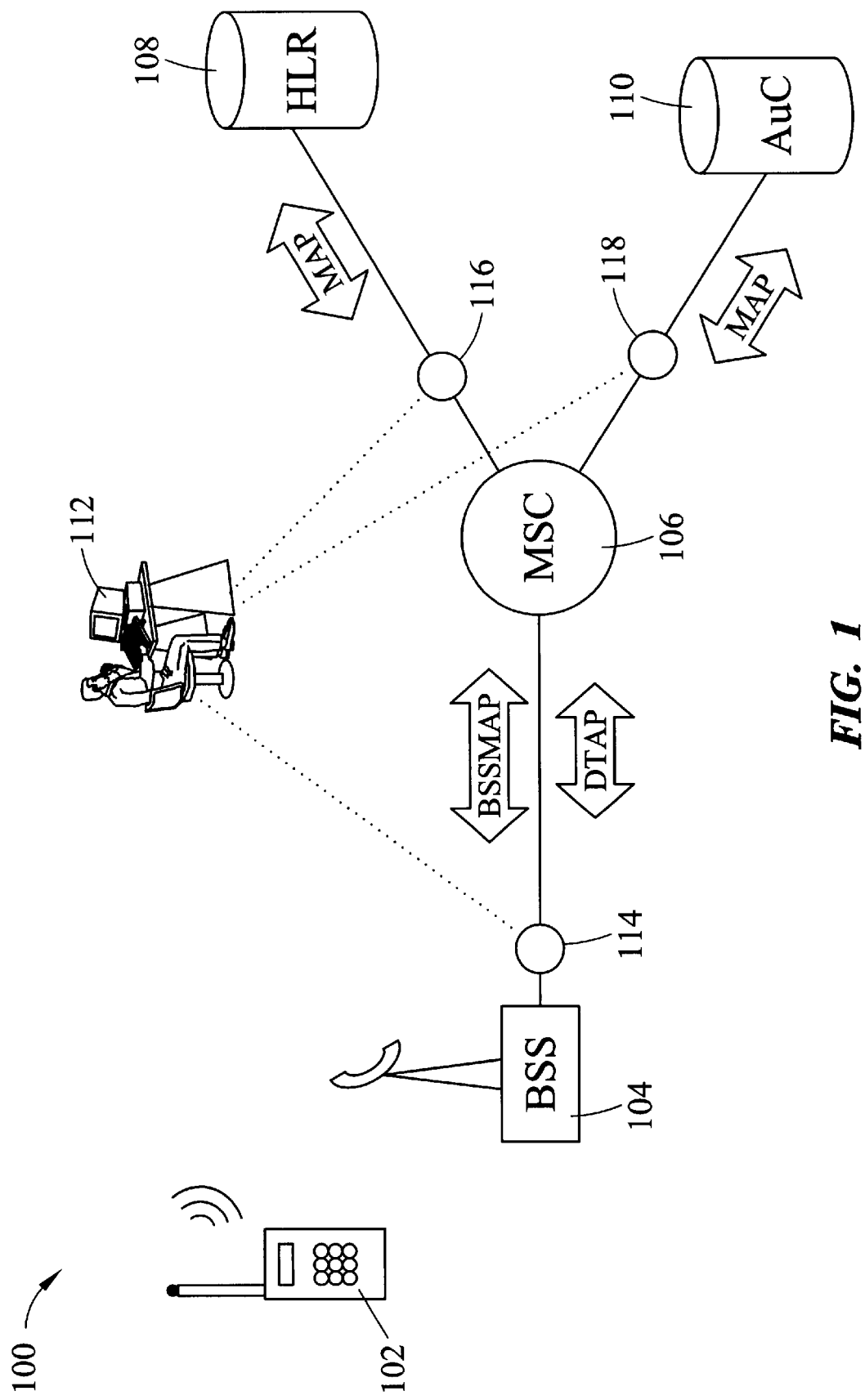
FIG. 1 is a diagram illustrating a prior art mobile telecommunications network architecture and associated network elements.
Figure 2:
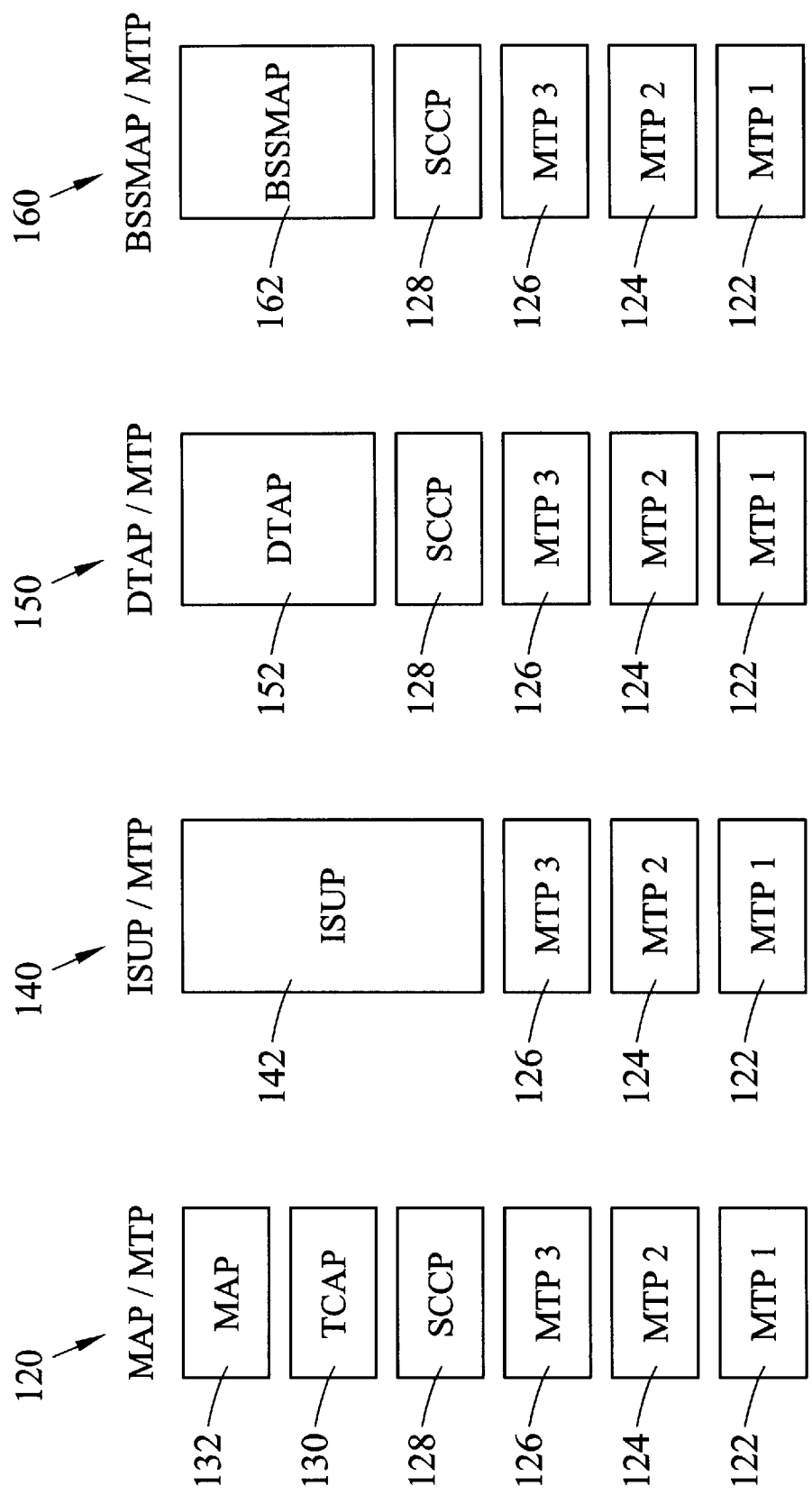
FIG. 2 is a block diagram of mobile signaling message protocol structures.

The above-mentioned filter criteria specified by a user are conveyed to the correlator process 308, as indicated in FIG. 4. Correlator process 308 is adapted to receive the initial user specified call trace criteria information and subsequently generate the appropriate filter criteria information to each provisioned LMM unit. In general, once constructed, filter criteria information is provided to the filter manger 306 which makes a copy of the filter set for each appropriately configured LMM, and these copies are subsequently provided to LMM routing process 310 which determines the appropriate destination LMM unit for the filter criteria information. Once a call trace has been initiated, correlator process 308 is adapted to receive a signaling message from an associated LMM unit and subsequently generate the next filter criteria set required to continue or complete the specified call trace. Once this determination or correlation is complete, the signaling message is passed to the user interface output process 314 for display. With regard to the process of correlation, it will again be appreciated from FIG. 2 that different signaling message types carry different information that is organized in different formats. Consequently, there is no guarantee that a particular parameter found in a first type signaling message (e.g., BSSMAP) is also included in a second type signaling message (e.g., ISUP). It is the responsibility of the correlator process 308 to maintain and apply a sequenced mapping of parameters in different signaling message types that contain similar or equivalent information, such that information gleaned from a first signaling message can be used to search for the next signaling message in the call trace sequence. It is through the application of this parameter mapping and sequencing function that the automatic correlation of many signaling messages of differing types, all of which are associated with the same mobile call, is achieved by the monitoring system of the present invention.

A sample set of signaling message parameter mapping and sequencing rules that may be maintained and applied by correlator 308 is illustrated in table 350 of FIG. 5. In FIG. 5, each row of table 350 indicates a sequence of messages of the same or different types and the parameters used to correlate the messages. During call setup, multiple message types can be sent between entities involved in the call setup. In addition, the same parameter may not be available in all of the messages for correlating the messages Accordingly, correlator 308 preferably generates filter criteria that correlate multiple message types using a variety of parameters. For example, in table 350 at trace sequence 2, the filter criteria correlate a BSSMAP message having a particular called number value with a DTAP message having a particular DLRN value. Similarly, in trace sequence 3, the filter criteria correlate a DTAP message having a particular called number value with a MAP message having a particular transaction ID value. Because correlator 308 is capable of generating filter criteria for detecting and correlating multiple message types using different parameters, a mobile network monitoring system according to the present embodiment is especially well suited for network environments in which multiple protocols are utilized.

Of particular significance in table 350 are the two entries (trace sequences 5 and 6) relating equivalent DTAP/MAP parameters and equivalent MAP/BSSMAP parameters. As discussed previously, automatic correlation of signaling messages generated and communicated between a BSS air-interface and an MSC (e.g., DTAP and BSSMAP) with those signaling messages typically associated with the SS7 protocol (e.g., ISUP, TCAP and MAP) has not previously been possible. Yet, correlation of such BSS-MSC signaling messages is essential in order to obtain a complete or comprehensive trace of a mobile call.

Referring back to FIG. 4, communication interface 302 is adapted to facilitate the transmission and reception of data between the MCP 300 and a LMM unit. More particularly, communication interface 302 is responsible for packaging filter criteria information within an appropriately formatted and addressed TCP/IP data packet for transmission to a destination LMM unit. The discussion presented herein assumes that the protocol used to facilitate communication between an MCP and a LMM unit is transmission control protocol/Internet protocol (TCP/IP). However, it will be appreciated by those skilled in the art of network communications that a variety of communication protocols such as UDP/IP, frame relay, asynchronous transfer mode (ATM), SONET, etc., could be used to establish an MCP to LMM communication link. Communication interface 302 is also responsible for receiving and unpackaging TCP/IP datagrams that contain copies of signaling messages sent to the MCP 300 by LMM units.

Figure 6:
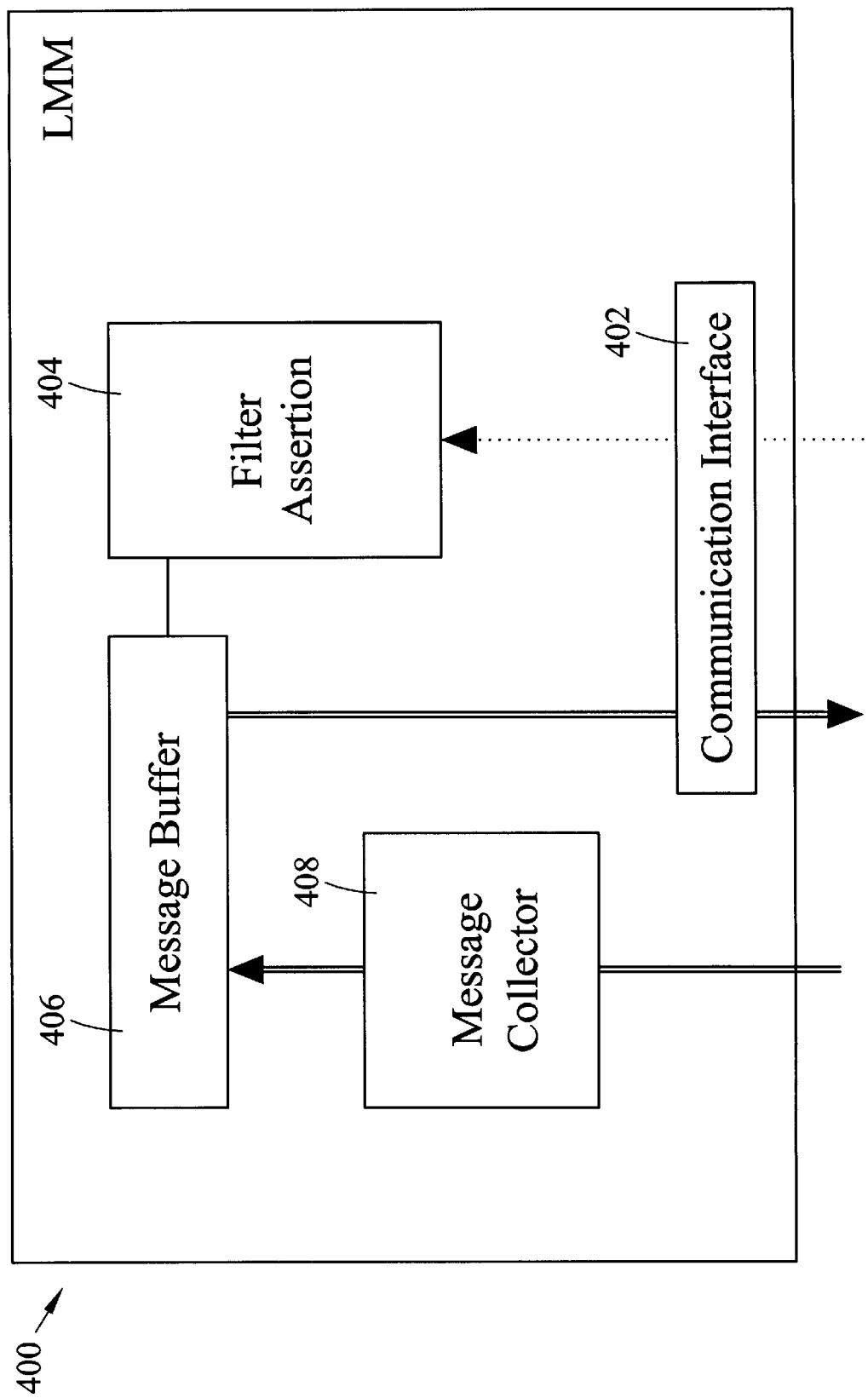
FIG. 6 is a diagram of a link monitoring module (LMM) according to an embodiment of the present invention.

Shown in FIG. 6 is a Link Monitoring Module (LMM), generally indicated by the numeral 400. LMM 400 includes a communication interface process 402, a filter assertion process 404, a message buffer 406, and a message collection process 408. Communication interface process 402 is adapted to facilitate the transmission and reception of data between the LMM 400 and an MCP unit. More particularly, communication interface process 402 is responsible for unpacking filter criteria information from an incoming TCP/IP filter criteria data packet received from an associated MCP unit. Once again, the discussion presented herein assumes that the protocol used to facilitate communication between a LMM and an MCP unit is TCP/IP. However, other functionally similar communication protocols could be alternatively employed, as discussed above. Once unpacked, filter criteria information is passed from communication interface process 402 to filter assertion process 404. Filter assertion process 404 is adapted to receive and decode the incoming filter criteria information. Process 404 then assert the filter criteria against the contents of message buffer 406. Message buffer 406 is adapted to receive and temporarily store or buffer signaling messages. These signaling messages (e.g., BSSMAP, DTAP, ISUP, MAP) are first received by the message collector process 408, which is adapted to effectively copy signaling message traffic that is being transmitted over a monitored signaling communication link. The specific configuration of a message collector process on a LMM depends upon the type of signaling communication link that the LMM is intended to monitor. For example, a LMM that is placed on a SS7/MTP signaling link may include a message collector process that is adapted to interpret the MTP transport protocol suite; whereas, a LMM that is placed on a SS7/TCP/IP signaling link may include a message collector process that is adapted to interpret the TCP/IP transport protocol suite. As used herein, the phrase transport protocol suite refers to physical, data link, and network layer functionality, as defined in the ISO open systems interconnect model.

Communication interface 302 is also responsible for receiving signaling messages that have been selected, based on a filter criteria set, from the message buffer 406 and subsequently packaging these select signaling messages in TCP/IP packets for delivery to an MCP.

Automatic Signaling Message Correlation

At this point, It should be appreciated that one of the major functions of the network monitoring system of the present invention is the automatic correlation of a plurality of signaling messages associated with a particular mobile call, wherein the mobile call related signaling messages are formatted in different signaling protocols (e.g., BSSMAP, DTAP, MAP, ISUP, TCAP). As such, all signaling messages related to a call may be collected and displayed, regardless of the particular monitored signaling link over which they traverse. Those skilled in the art of telecommunication networking will appreciate that signaling messages related to a specific mobile call may be interspersed with hundreds or thousands of other signaling messages that are not relevant to the concerned call, and which consequently must be ignored by a monitoring system.

Figure 7:
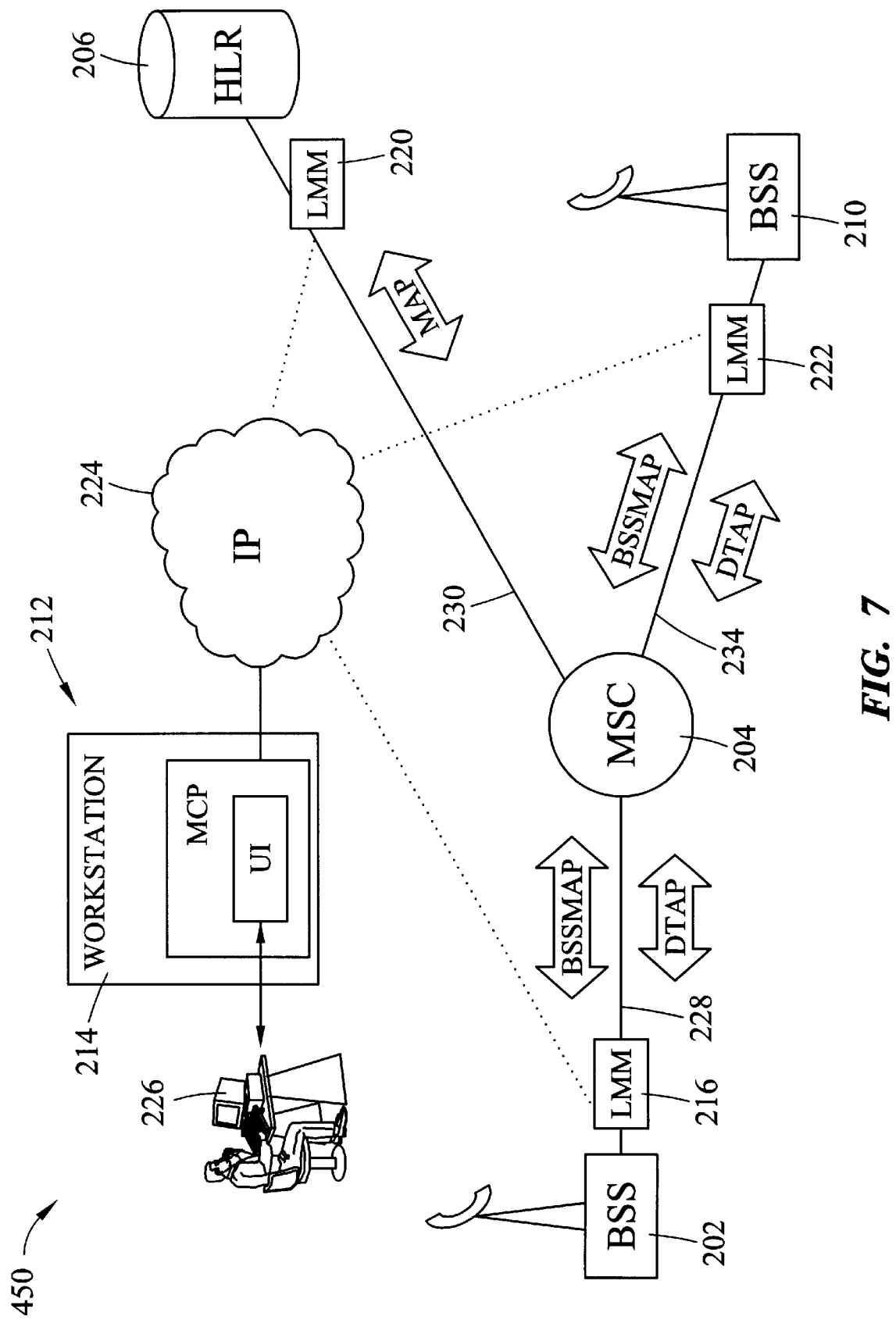
FIG. 7 is a network diagram illustrating another implementation of a network monitoring system according to an alternative embodiment of the present invention in a global system for mobile communication (GSM) network.
Figure 8A:
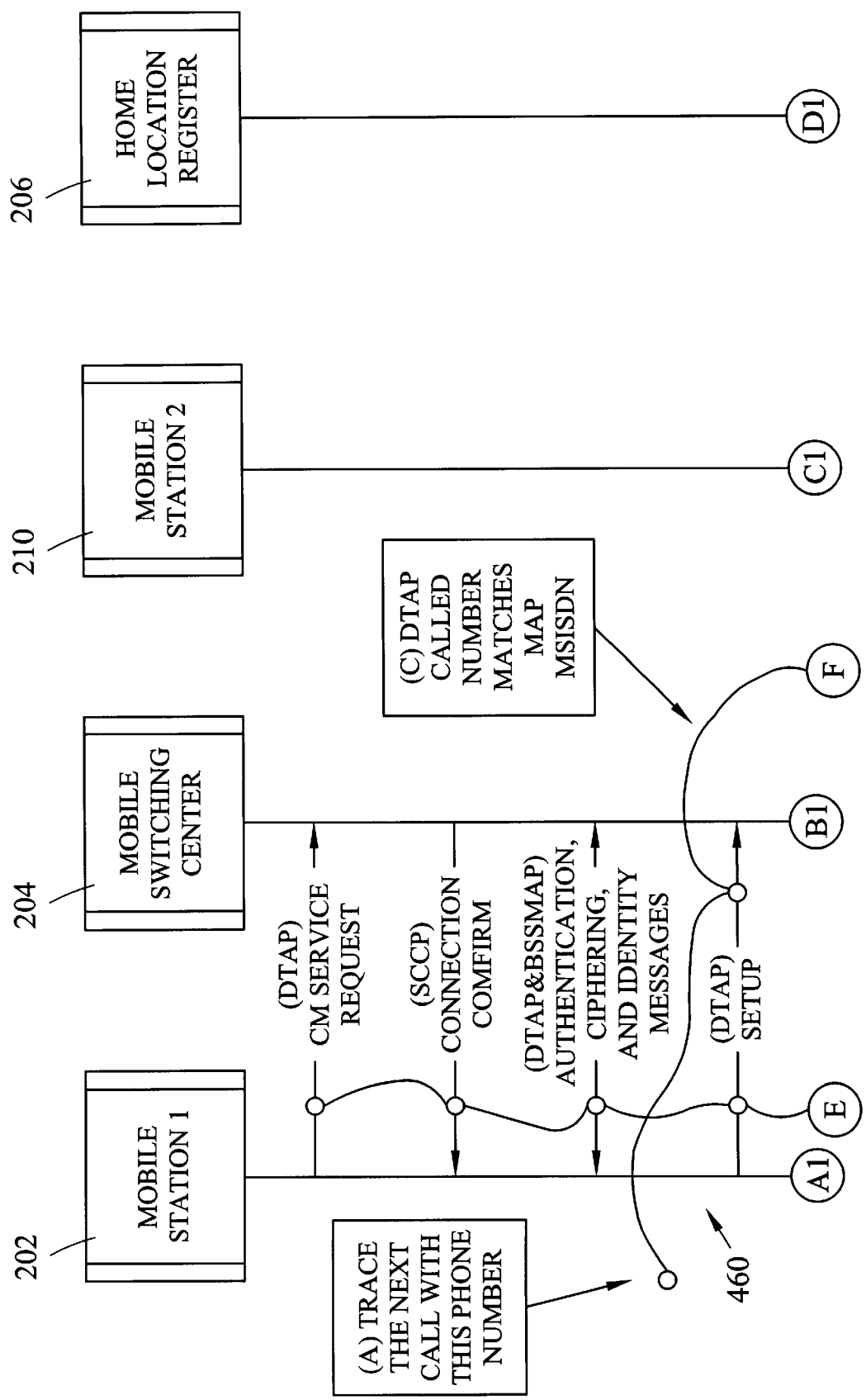
FIGS. 8A–8D illustrate a call flow diagram associated with a mobile call in a GSM wireless communication network.
Figure 8B:
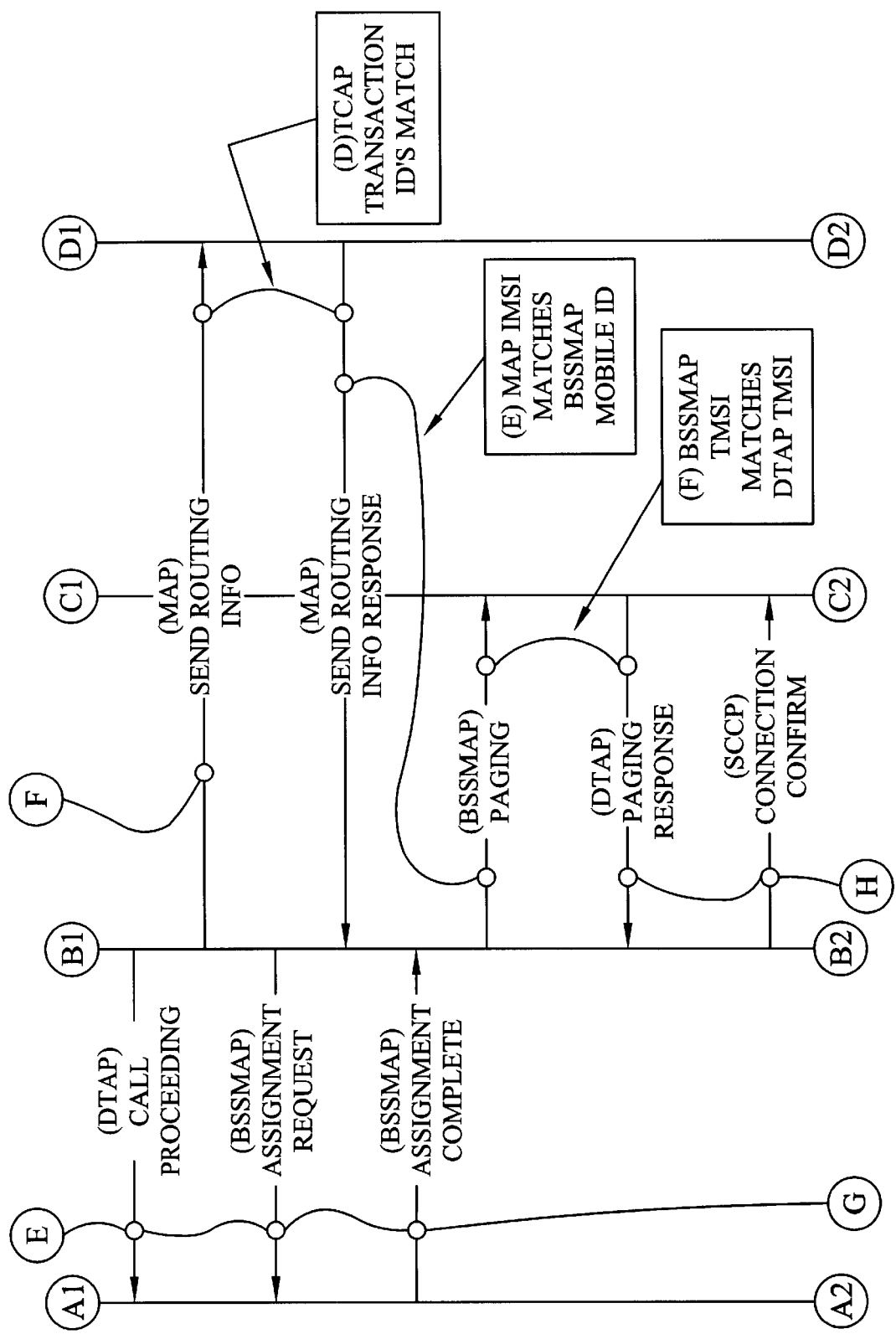
Figure 8C:
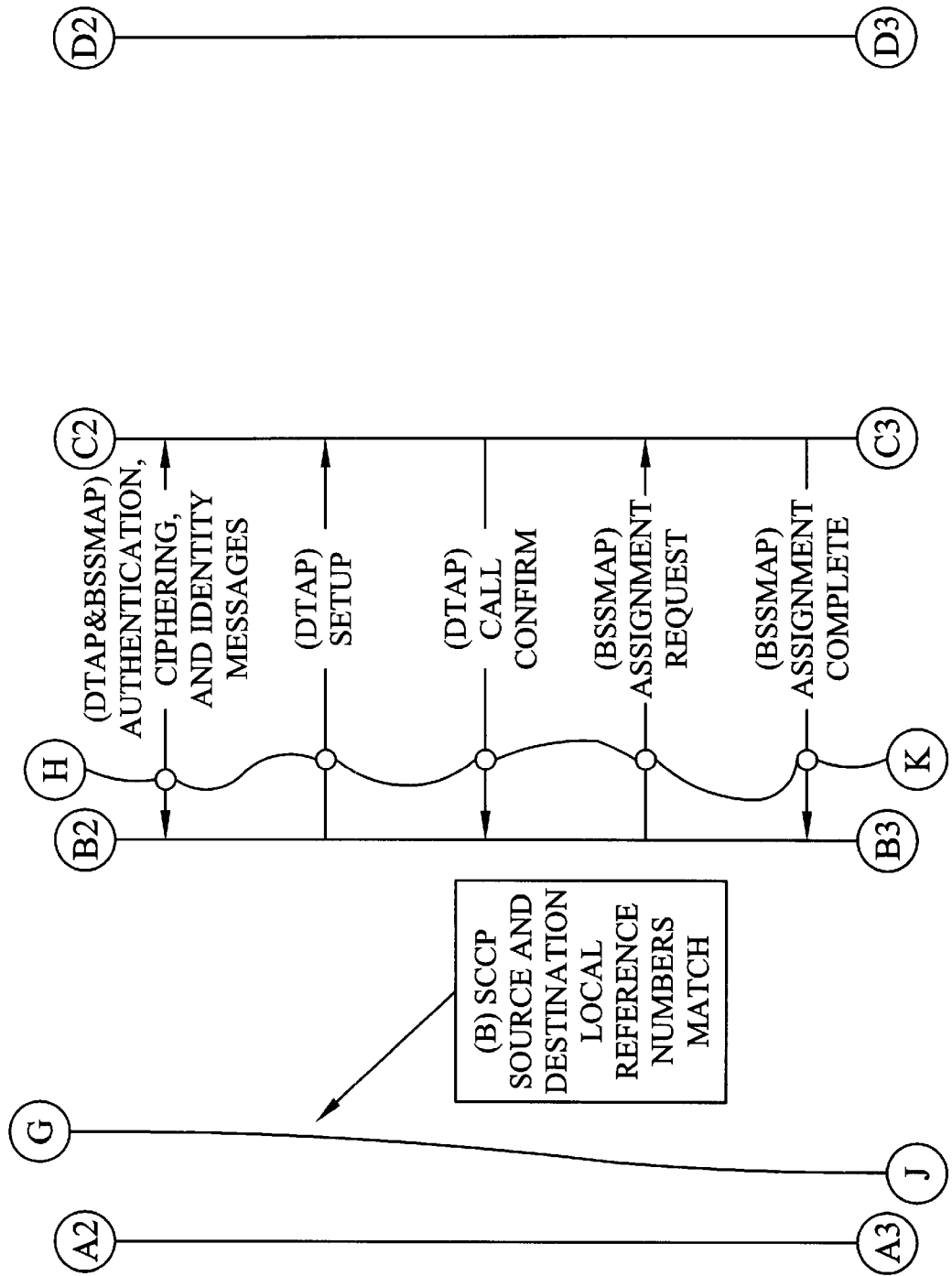
Figure 8D:
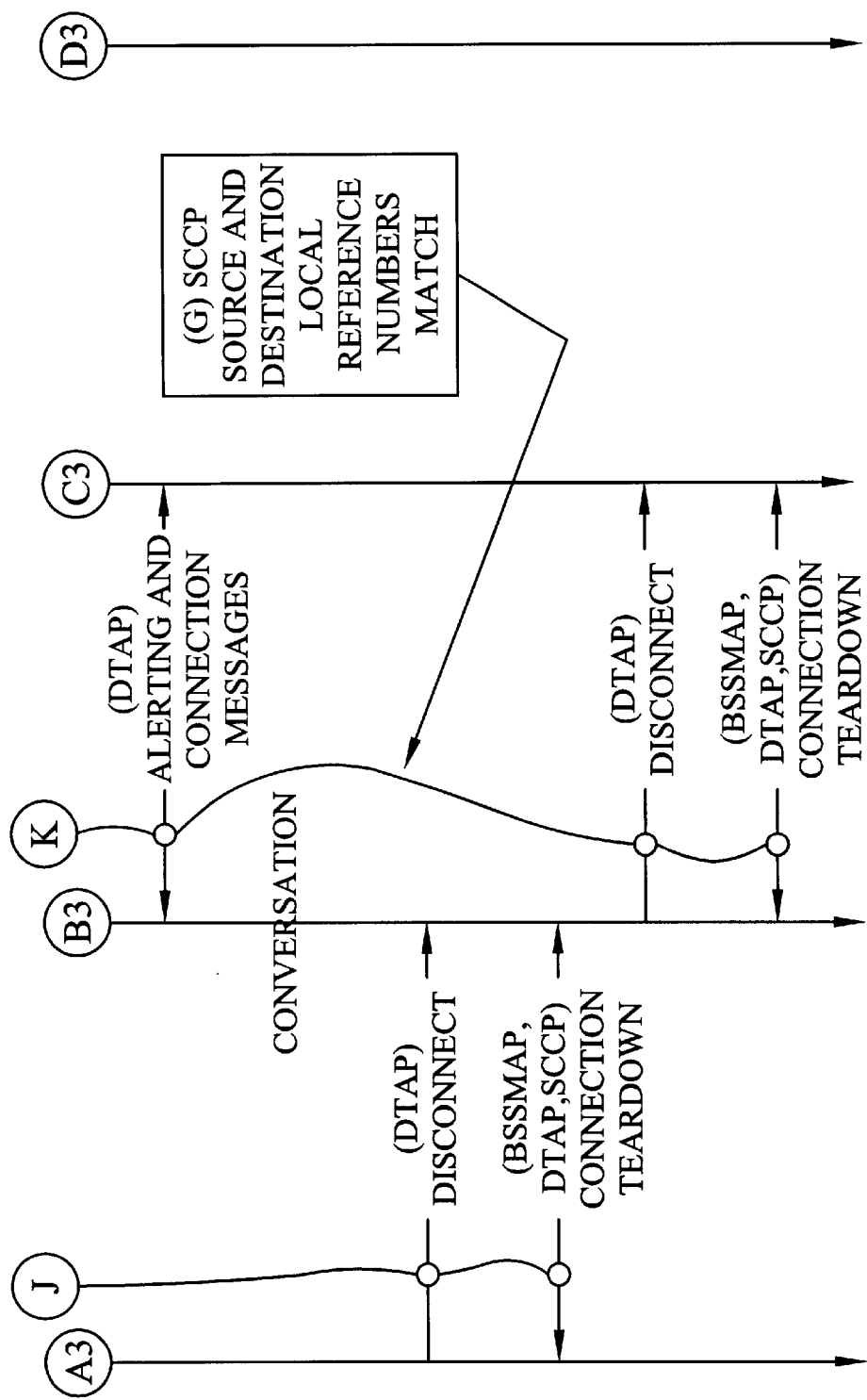

FIG. 7 illustrates a simplified GSM mobile communications network, generally indicated by the numeral 450. Network 450 is similar in architecture to the GSM network 200 previously discussed and illustrated in FIG. 3. As such, GSM network 450 includes a first base station transceiver system (BSS) 202, a first mobile switching center 204, a home location register (HLR) 206, and a second BSS 210. Also included in FIG. 7 is a network monitoring system of the present invention, generally indicated by the numeral 212. Network monitoring system 212 is comprised of a central message correlating or processing platform 214, and a plurality of associated communication link probes. More specifically, in the example shown in FIG. 7, network monitoring system 212 includes a first link monitoring module (LMM) 216, a second LMM 220, and a third LMM 222. Each LMM is communicatively coupled to central message correlating platform 214 via an Internet protocol (IP) communication network 224. Central message correlating platform 214 is adapted to provide a user 226 with a user interface (UI) such that the user may enter monitoring and correlating instructions and observe the subsequent results.

As further indicated in FIG. 7, simplified GSM network 450 includes a plurality of signaling links, with each link effectively communicatively coupling a pair of network nodes. More particularly, signaling link 228 is adapted to carry signaling messages between BSS 202 and MSC 204. It will be appreciated from FIG. 7 that the signaling protocols supported on link 228 include BSSMAP and DTAP. Signaling link 230 is adapted to carry signaling messages between MSC 204 and HLR 206. Again, it will be appreciated from FIG. 7 that the signaling protocols supported on link 230 include mobile application part (MAP). Signaling link 234 is adapted to carry signaling messages between MSC 204 and BSS 210. As with link 228, the signaling protocols supported on link 234 include BSSMAP and DTAP.

In the operational example provided below, it is assumed that user 226, shown in FIG. 7, wishes to trace the next mobile call that is placed to a certain telephone number. As such, user 226 enters the appropriate instructions via a user interface associated with central message correlating platform 214. Referring to FIG. 4, it will be appreciated that user interface input process 312 receives the user request for a trace on the next call to the specified number, and subsequently passes this trace request information to correlator process 308. Upon receipt of the initial trace request, correlator process 308 generates the appropriate network monitoring system filter set corresponding to at least one appropriately provisioned LMM unit with which MCP 300 is in communication. This filter set is then passed to filter manager process 306 where a copy of the filter set is made for each appropriately provisioned LMM in the monitoring system. Each filter set copy is then passed to LMM routing process 310 where each copy is packaged and addressed to an appropriate destination LMM unit. Each packaged filter set is then passed to communication interface 302 for further packaging or encapsulation within a TCP/IP datagram for transmission from the central processing platform 214 through TCP/IP network 224 to an appropriate destination LMM unit. Examples of filter sets that may be provided to LMMs 216, 220, and 222 will be described in detail below with regard to FIGS. 8A–8D.

As indicated in FIG. 7, LMM specific filter sets are transmitted from the central processing platform 214 to one or more provisioned LMMs via TCP/IP network 224. It will be appreciated from FIG. 6 and the previous discussion of LMM design presented above that each LMM receives a TCP/IP datagram which contains a filter criteria set packet. Communication interface 402, shown in FIG. 6, receives an incoming TCP/IP datagram and subsequently unpacks or decapsulates the datagram so as to generally extract the filter criteria set packet contained therein. The filter criteria information is then passed to the filter assertion process 404. Upon receipt of the filter criteria information, filter assertion process 404 initiates an examination of signaling messages stored in message buffer 406. Copies of any signaling messages residing in the message buffer 406 that satisfy the specified filter criteria are made and passed to the communication interface 402.

With particular regard to the case where the matching of telephone numbers is dictated by a filter criteria set, it will be appreciated that a LMM unit of the present invention is adapted to perform a flexible type of number matching between related signaling messages. The implementation of flexible number matching algorithms in a LMM provides a method of matching telephone numbers or other identification numbers that may have a prefix, (e.g. an area code or country code), or suffix, (e.g. a filler digit), in one message that is not present in another, related message although the numbers denote the same entity. This method requires that a certain minimum number of "core" digits match exactly. Any prefixes or suffixes are then examined. If both numbers have a prefix and the prefixes differ, or if both numbers have a suffix and the suffixes differ, then this is not considered a match. In this manner, LMM units contain the intelligence necessary to perform flexible or fuzzy number matching among related signaling messages. Furthermore, this flexible number matching intelligence may also be incorporated directly within the central processing platform so as to allow for off-line processing of signaling message traffic that is buffered via data storage media associated with and coupled to the central processing platform.

It will be appreciated that network monitoring is a dynamic process -signaling messages are constantly being received by message collector process 408, and consequently message buffer 406 is constantly being updated with new information. Therefore, while a signaling message meeting the specified filter criteria may not reside in message buffer 406 at the time that a new filter criteria is received at the LMM, filter assertion process 404 will continue to examine buffer 406 until a signaling message meeting the filter criteria is inserted into the buffer or a command is received from the central processing platform 214 instructing the LMM to discard the filter set.

Returning to communication interface 402, it will be appreciated that upon receipt of a signaling message meeting the filter criteria from message buffer 406, communication interface 402 encapsulates the signaling message within a TCP/IP datagram that is addressed to central processing platform 214, and transmits the datagram through TCP/IP network 224. The TCP/IP encapsulated signaling message is ultimately received by the corresponding communication interface process 302 associated with the MCP 300 that resides on central processing platform 214. Communication interface 302 decapsulates the TCP/IP datagram so as to generally extract the signaling message contained therein. The signaling message is then passed to correlator 308 where the message is examined, used to generate the next LMM specific filter set, and ultimately presented to the user interface 304 for handling and display by output process 314.

FIGS. 8A–8D illustrate a mobile call flow diagram associated with simple call trace through the example GSM network 450 presented in FIG. 7. In FIGS. 8A–8D, the curvilinear lines connecting the various messages indicate messages that can be correlated using the same or a related parameter. For example, in block (A), network monitoring system 112 according to an embodiment of the present invention may receive a request to trace a call to a particular number. As indicated by the curvilinear path associated with block (A), the DTAP called number value and the MAP MSISDN value may be used to locate DTAP and MAP messages associated with the call. Block (B) and its associated curvilinear line indicate a sequence of DTAP and BSSMAP messages that can be correlated based on SCCP source and destination local reference numbers. Block (C) and its associated curvilinear path indicate correlation of a DTAP message with a MAP message based on a match between the called number in the DTAP message and the MSISDN number in the DTAP message. Block (D) and its associated curvilinear path indicate correlation of TCAP messages based on transaction IDs. Block (E) and its associated curvilinear path indicates the correlation of a MAP message with a BSSMAP message when the MAP IMSI number matches the BSSMAP mobile identification parameter. Block (F) and its associated curvilinear path indicate correlation of a BSSMAP message and a DTAP message when the BSSMAP TMSI parameter matches the DTAP TMSI parameter. Finally, block (G) and its associated curvilinear path represent BSSMAP and DTAP messages that can be correlated when SCCP source and destination local reference numbers match. Because the network monitoring system according to the present invention is capable of correlating messages of different types using different parameters, a complete set of messages associated with a mobile call can be collected.

Example Filter Sets

The following examples illustrate filter sets that may be delivered to LMMs 216, 220 and 222 for the mobile-to-mobile call trace illustrated in FIGS. 8A–8D. The steps described below must be performed sequentially, even though they are executed by different LMMs.

Filter Set Example for LMM 216

LMM 216 performs steps to find all messages for this BSSAP sequence. The steps performed by LMM 216 for various DTAP/BSSMAP and SCCP messages in FIGS. 8A–8D are:

DTAP Setup message

Step 1. Searching forward, find the next DTAP Setup message with a Called Party field that matches this Phone Number.

Back to SCCP Connection Confirm

Step 2. Searching backward, find the next SCCP Connection Confirm message whose Source or Destination Local Reference field matches the Destination Local Reference of the message found in Step 1 and the Origination and Destination Point Codes match (possibly reversed), those of the message found in Step 1.

Back to SCCP Connection Request

Step 3. Searching backward, find the next SCCP Connection Request message whose Source Local Reference field matches the Destination Local Reference of the message found in Step 2 and the Origination and Destination Point Codes match (possibly reversed), those of the message found in Step 2.

Rest of A-Interface Connection

Step 4. Searching forward, find the next SCCP message whose Source or Destination Local Reference field matches the Source or Destination Local Reference of the message found in Step 3 and the Origination and Destination Point Codes match (possibly reversed), those of the message found in Step 3.

Go Back to DTAP Setup

Step 5. Searching backward, find the next DTAP Setup message with a Called Party field that matches the Called Party field found in Step 1. (The same Setup message found in Step 1.)

Filter Set Example for LMM 220

LMM 220 performs steps to find associated MAP SendRoutingInfo(SRI) Begin and End. The steps performed by LMM 220 for various MAP and TCAP messages illustrated in FIGS. 8A–8D are:

Send Routing Info

Step 6. Searching forward, find the next MAP Send Routing Info message whose MSISDN number matches the Called Party field found in Step 1.

Send Routing Info Response

Step 7. Searching forward, find the next TCAP message whose Originating or Destination Transaction ID matches the Originating or Destination Transaction ID found in Step 6. This will be the response to MAP Send Routing Info message found in Step 6.

Go Back to Send Routing Info

Step 8. Searching backward, find the same MAP Send Routing Info message found in Step 6.

Find associated MAP ProvideRoamingNumber(PRN) Begin and End.

Provide Roaming Number

Step 9. Searching forward, find the next MAP Provide Roaming Number message whose IMSI number matches the IMSI of the message found in Step 7.

Provide Roaming Number Response

Step 10. Searching forward, find the next TCAP message whose Originating or Destination Transaction ID matches the Originating or Destination Transaction ID found in Step 6. This will be the response to MAP Provide Roaming Number message found in Step 9.

Filter Set Example for LMM 222

LMM 222 performs steps to find BSSMAP Paging Broadcast message. The steps performed by LMM 222 for various DTAP, BSSMAP, and SCCP messages illustrated in FIGS. 8A–8D are:

BSSMAP Paging message

Step 11. Searching forward, find the next BSSMAP Paging message whose Mobile ID field matches the IMSI field found in Step 7.

Find entire associated BSSAP Paging Response sequence.

DTAP Paging Response

Step 12. Searching forward, find the next DTAP Paging Response message whose TMSI field matches the TMSI field found in Step 11.

Connection Confirm

Step 13. Searching forward, find the next SCCP Connection Confirm message whose Source or Destination Local Reference field matches the Source or Destination Local Reference of the message found in Step 12.

Rest of A-Interface Connection

Step 14. Searching forward, find all SCCP messages whose Source or Destination Local Reference field matches the Source or Destination Local Reference of the message found in Step 13 and the Origination and Destination Point Codes match (possibly reversed), those of the message found in Step 13, stopping when one of these message is an SCCP Release Complete message.

Example Call Trace

A simplified call trace example will now be described using a network monitoring system according to the present invention. In the call trace example provided below, it is assumed that user 226 wishes to trace the next mobile call that is placed to the telephone number 919-460-5500. As such, user 226 enters the appropriate trace instructions via a user interface associated with central message correlating platform 214.

The trace begins by searching for a DTAP signaling message with a Called Number parameter value equal to 919-460-5500, as generally indicated in trace sequence number 1 shown in table 350 of FIG. 5. Following the general processes described above for MCP operation, it will be appreciated that a correlator process 308 generates a filter criteria set in response to the user call trace request. This filter criteria set is processed by a filter manager 306, communication interface 302, and ultimately delivered to the only two LMM units that are provisioned in system 212 to monitor links that support DTAP type signaling traffic, LMM 216 and LMM 222. It will, however, be further appreciated that the filter criteria set could be delivered to all LMM units regardless of the type of signaling communication links that each LMM is adapted to monitor. Such a LMM specific filter criteria delivery described herein is not essential to the operation of the present invention, but simply yields a more efficient use of bandwidth resources in the data network 224.

Figure 9:
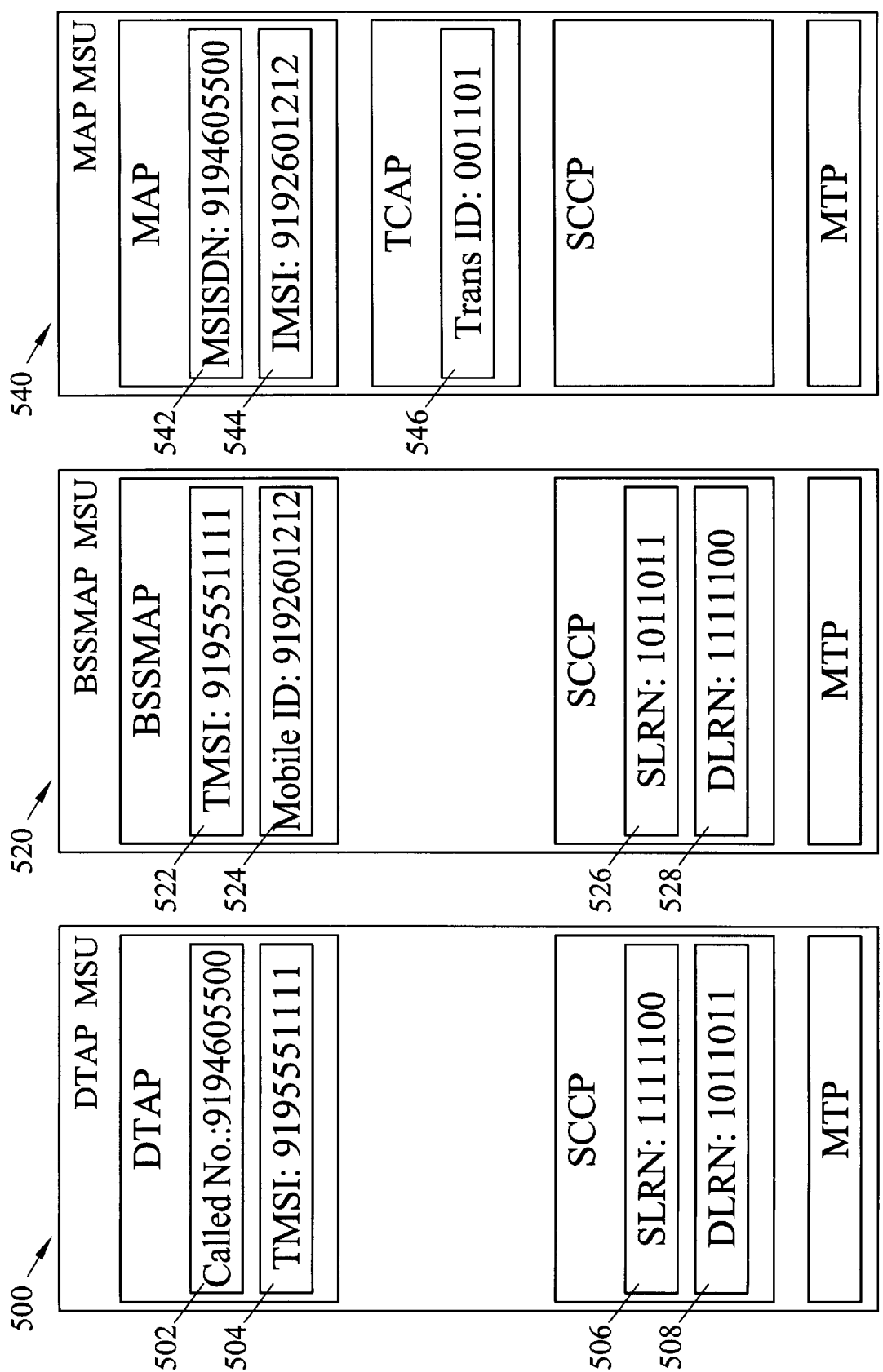
FIG. 9 is a diagram illustrating several call signaling messages employed in a typical GSM wireless communication network.

FIG. 9 illustrates various message types and parameters that may be correlated by the filter criteria. For example, in FIG. 9, DTAP message 500 includes a called number parameter 502, a temporary mobile subscriber identifier (TMSI) parameter 504, a source local reference number (SLRN) parameter 506, and a destination local reference number (DLRN) parameter 508. BSSMAP message 520 includes a TMSI parameter 522, a mobile ID parameter 524, a SLRN parameter 526, and a DLRN parameter 528. MAP message 540 includes an MSISDN parameter 542, an IMSI parameter 544, and a transaction ID 546. Various combinations of these differing parameters may be used to correlate messages associated with a mobile call, as will be discussed in more detail below.

LMM 216 and LMM 222 receive the filter criteria set and assert the filter criteria against their message buffers. It is assumed in this example that a DTAP message 500, as shown in FIG. 9, is located by LMM 216. In this case called number parameter 502 of DTAP message 500 matches the user specified number to be traced, so the filter assertion process residing on LMM 216 makes a copy of the DTAP message and forwards the message via TCP/IP network 224 to the central processing platform 214. Correlator process 308 (shown in FIG. 4) residing on central processing platform 214 receives the selected DTAP signaling message sent from LMM 216 and subsequently examines the SLRN parameter 506 contained in the DTAP message. The value of the SLRN parameter, 1111100, is used by correlator process 308 to construct a second filter criteria set that is intended to search for an associated BSSMAP Assignment Complete message. In a manner analogous to the first filter set, this second filter criteria set is passed to a filter manager, communication interface, and ultimately delivered to the only two LMM units that are provisioned in system 212 to monitor links that support BSSMAP type signaling traffic, LMM 216 and LMM 222.

As indicated in FIGS. 8 and 9, it is assumed that a second message that satisfies the second filter criteria is located by LMM 216. This second message is BSSMAP message 520, shown in FIG. 9. It will be appreciated that the DLRN of BSSMAP message 520 matches the SLRN of the first DTAP message 500. Consequently, a copy of BSSMAP message 520 is sent by LMM 216 to the central processing platform 214, for further inclusion in the call trace and eventual presentation to the user.

In response to receiving the BSSMAP message 520 that matches the second filter criteria, central processing platform prepares a third filter criteria set and distributes the third filter criteria set only to LMM 220. In this case, the particular filter criteria set is concerned with locating a MAP message that contains an MSISDN parameter value that matches the called number parameter value of the DTAP message 500. Since LMM 220 is the only LMM unit in monitoring system 212 that is provisioned to monitor MAP signaling traffic, the filter criteria set is sent only to LMM 220. Once again, it is assumed that a matching MAP message 540 is located by LMM 220 and subsequently returned to platform 214. As shown in FIG. 9, the selected MAP message 540 includes an MSISDN parameter value of 919460550, which matches the DTAP called number parameter value of 9194605500.

From FIG. 8 it will be appreciated that by following the process described above whereby one located signaling message involved in a traced call is used to glean information related to the next signaling message for which to search, a complete and comprehensive call trace sequence can be obtained and presented to a user. Furthermore, such call traces can include signaling messages associated with a call trace that are transmitted between an air-interface BSS and an MSC node in a wireless network. By enabling individual LMM units to intelligently and selectively search a communication link for signaling messages associated with a particular call, a considerable savings is realized in the processing power and resources required of a central processing platform. Additionally, bandwidth requirements are significantly reduced in the TCP/IP or equivalent network which facilitates communication between the central processing platform and LMM units.

SAM Processing

Subsequent address message (SAM) processing may be performed for a called number type trace, where an ITU-based SS7 protocol is being employed. More particularly, SAM processing may be required in ISDN user part (ISUP) and/or telephone user part (TUP) called number type mobile call traces. Those skilled in the art of telecommunications will appreciate that SAM messages are used in ITU-based SS7 protocols to continuously forward as many of the called number digits as possible while the caller is still dialing. In such scenarios, the first group of dialed digits is sent in the called number field of an ISUP initial address message (IAM), with any "straggler" digits being subsequently sent in one or more associated SAM messages. In order to provide a called number trace on a called number that may be split up across multiple SS7 messages, it is necessary to perform partial matching and scanning in order to re-create the complete called number from the plurality of related SS7 messages.

For example, in the event that a called number trace has been requested, the correlator process 308 (FIG. 4) will determine whether the ISUP signaling protocol is ITU-based. If the ISUP signaling protocol is, in fact determined to be ITU-based, this simply indicates the potential presence of SAM messages. Correlator process 308 subsequently compares the digits stored in a first received ISUP IAM message with the trace digits requested by the user. If the digits in the first ISUP IAM message match exactly with the digits from the user (i.e., a perfect match), then no scanning must be done for SAM messages.

If there are fewer digits in the first ISUP IAM than the user has requested, and those 'n' digits do not match the first 'n' trace digits that the user has requested, then there is no need to perform SAM scanning, as the called numbers will not match.

However, if there are fewer digits in the first ISUP IAM than the user has requested, and those 'n' digits exactly match the first 'n' user specified trace digits, then the correlator process 308 initiates a scan for relevant SAM messages. This SAM scan is performed by finding all ISUP messages within a user-adjustable timeframe with the same OPC/DPC/CIC as the first ISUP IAM message. It will be appreciated that this "scan" is performed in a manner analogous to the basic tracing technique disclosed and discussed above. That is, one or more appropriate filter criteria sets are generated by the correlator process 308 and subsequently delivered to all appropriately provisioned LMM units in the monitoring system. Those LMMs receiving the filter criteria are adapted to search all monitored signaling messages within their storage buffers for matching SAM messages. Copies of any matching SAM messages are subsequently returned to the correlator 308 for further processing. Once all related SAM messages have been found within this block of time, the associated SAM address digits are reconstituted into the actual called number. If there is a match, then the call trace continues as usual. If there is no match, then the next IAM received by the correlator 308 is examined, and the process continues.

Billing Subsystem

Figure 10:
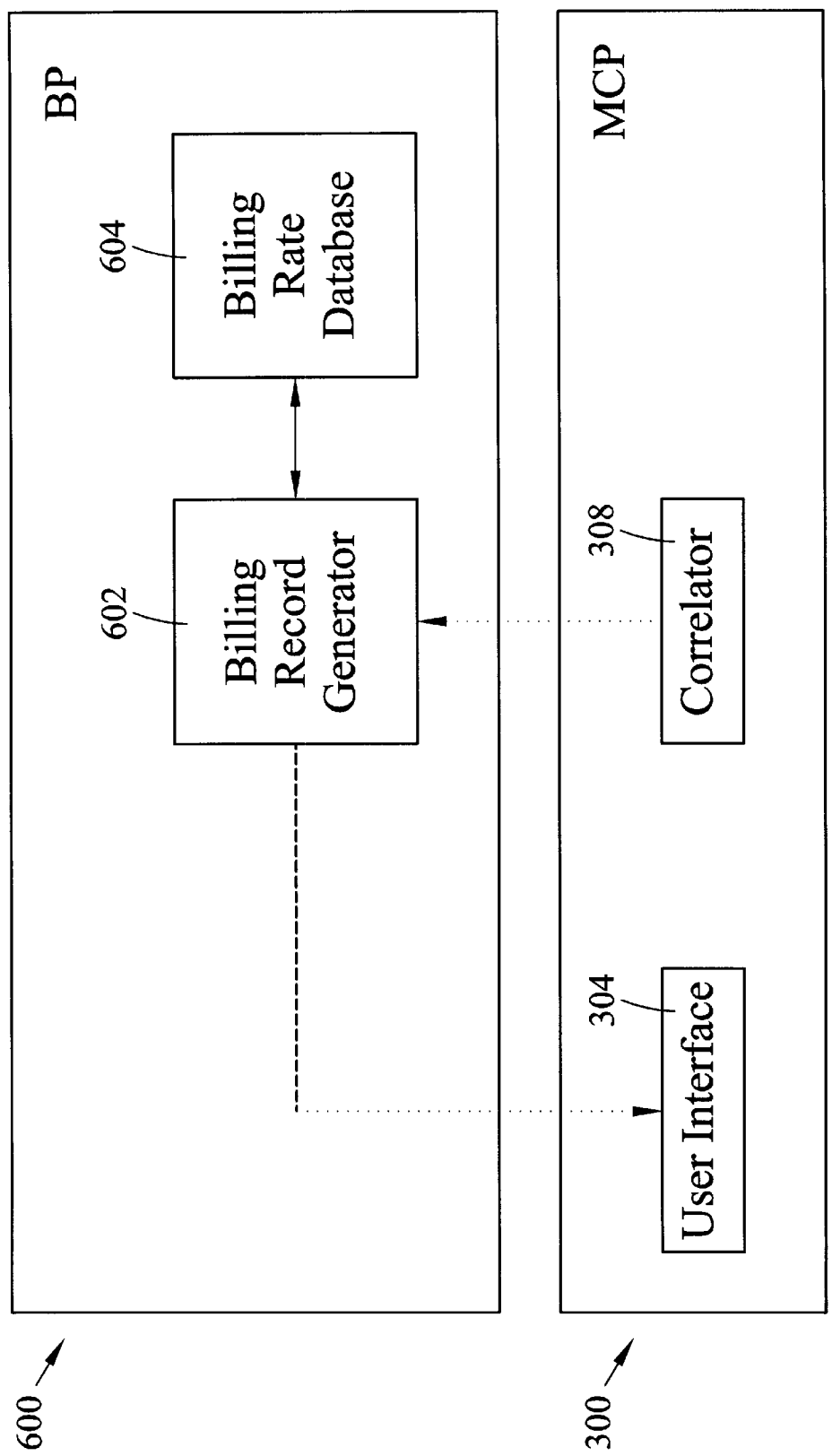
FIG. 10 is a block diagram illustrating a billing process of a network monitoring system according to an embodiment of the present invention.

An alternate embodiment of a network monitoring system of the present invention is shown in FIG. 10 that includes a billing process or subsystem 600. Billing process 600 is communicatively coupled to message collector process (MCP) 300, which has been described above in detail. Billing process 600 includes a billing record generator process 602 and a billing rate database process 604. Billing record generator process 602 is adapted to receive a related sequence of mobile call signaling messages from MCP 300, and to subsequently generate an associated billing record. The billing record is passed to the user interface process 304 for presentation to a user. Such billing records may be used to invoice customers or network operators for services facilitated by one or more of the observed mobile call signaling messages. The billing rate database 604 is adapted to communicate billing rate information to the billing record generator process 602. A sample billing rate database structure is presented in FIG. 11. As indicated in FIG. 11, a number of sample billing rules are contained within a table structure associated with the billing rate database 604. The sample table or database record structure presented includes a message type field 610, a message parameter field 612, a parameter value field 614, and a billing rate field 616. Based on this simplified example data structure implementation, a first billing rate rule could specify that any observed call sequence including a DTAP message with a called number parameter value of 9195551212 should be billed at a rate of $0.05 per occurrence. As indicated in FIG. 11, wild card values may be used in the specification of message types and parameter values.

It will be appreciated that the billing rate database shown in FIG. 11 is greatly simplified for the purposes of concept explanation. In practice, considerably more complex billing rate databases structures and rules may be employed by network operators, depending upon particular network architectures and billing requirements.

Figure 12:
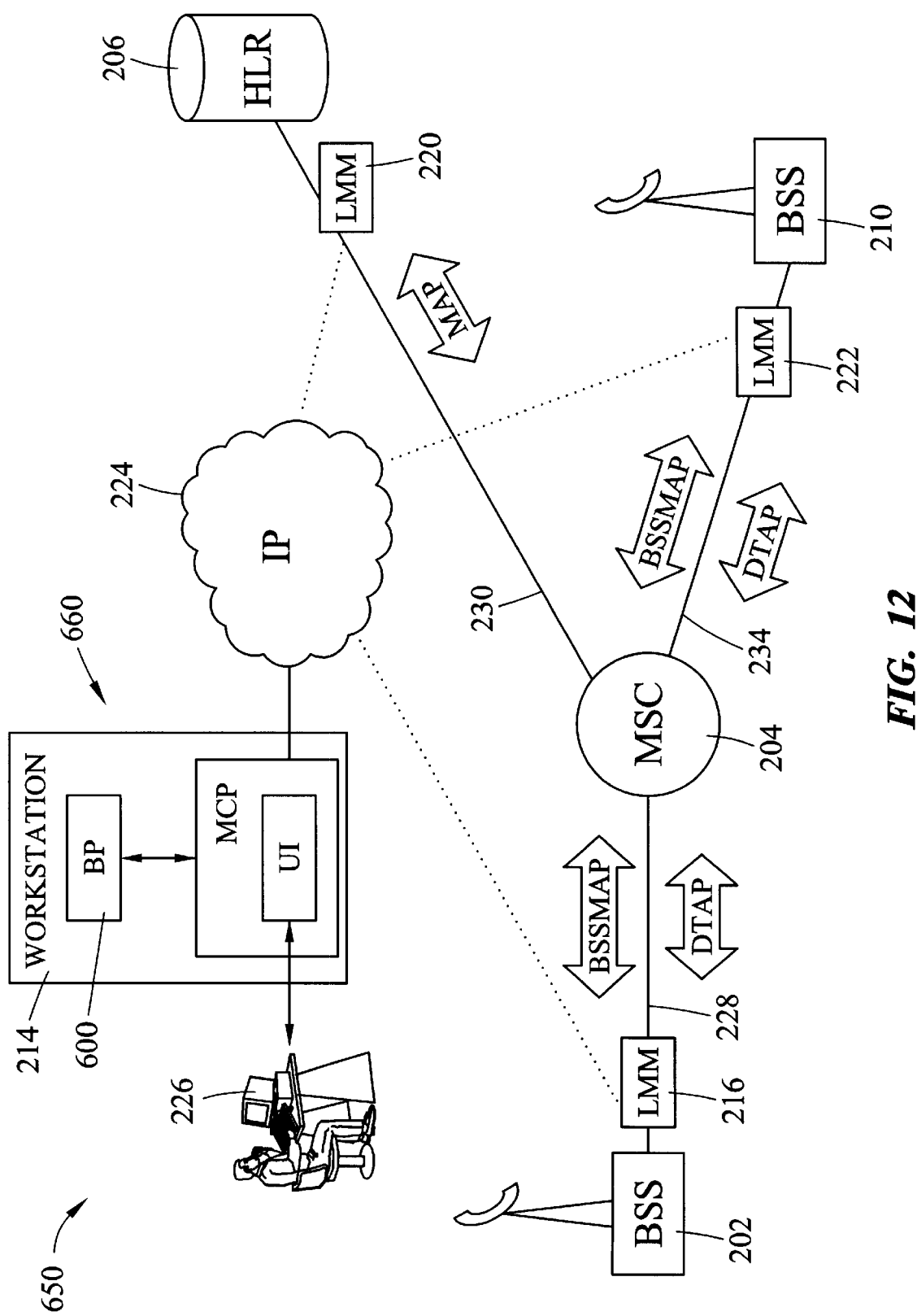
FIG. 12 is a block diagram illustrating a billing-subsystem-equipped network monitoring system according to an embodiment of the present-invention.

Illustrated in FIG. 12 is a sample implementation of a billing subsystem equipped network monitoring system of the present invention. More particularly, FIG. 12 includes a sample mobile communication network 650, which is similar in function and form to network 450 previously described. Adapted to monitor network 650 is a network monitoring system 660 of the present invention. Again, monitoring system 660 functions in a manner similar to that of monitoring system 212 as previously described herein. However, as compared to system 212, monitoring system 660 further includes the billing process or subsystem 600 that facilitates the generation of a billing record that is associated with one or more mobile call signaling messages that are observed by LMM units provisioned throughout the monitored network. Thus, using network monitoring system 660, a network operator has the ability to simultaneously perform end-to-end type mobile call traces and generate associated billing records or invoices.

It will be understood that various details of the invention may be changed without departing from the scope of the invention. Furthermore, the foregoing description is for the purpose of illustration only, and not for the purpose of limitation-the invention being defined by the claims.

What is claimed is:

1. A method for performing a trace of call signaling messages associated with a mobile communication in a wireless communication network, the method comprising:
   (a) specifying one or more call trace criteria parameters;
   (b) at a central processing platform;
      (i) generating first link monitoring module (LMM) filter criteria based on the specified call trace criteria parameters;
      (ii) transmitting the first LMM filter criteria to one or more LMM units via a data communication network;
   (c) at one of the LMM units;
      (i) receiving the first LMM filter criteria from the data communication network;
      (ii) using the first LMM filter criteria to search for signaling messages observed by the LMM that match the first LMM filter criteria;
      (iii) in response to locating a signaling message that matches the first LMM filter criteria, transmitting a copy of the matching signaling message to the central processing platform via the data communication network;
   (d) at the central processing platform:
      (i) receiving the copy of the matching signaling message;
      (ii) adding the matching signaling message to a call trace sequence;
      (iii) using information contained within the matching signaling message to create second LMM filter criteria; and
      (iv) transmitting the second LMM filter criteria to one or more of the LMM units via the data communication network.

2. The method of claim 1 wherein the wireless communication network is a global system for mobile communication (GSM) wireless communication network.

3. The method of claim 1 wherein the wireless communication network is an interim standard 41 (IS-41) wireless communication network.

4. The method of claim 1 wherein the wireless communication network is a personal communication services (PCS) wireless communication network.

5. The method of claim 1 wherein receiving the first LMM filter criteria includes receiving criteria for locating a direct transfer application part (DTAP) message.

6. The method of claim 5 wherein using information contained within the signaling message to generate the second LMM filter criteria includes generating criteria for locating a base station system management application part (BSSMAP) protocol message.

7. The method of claim 1 wherein receiving the first LMM filter criteria includes receiving criteria for locating a mobile application part (MAP) message.

8. The method of claim 7 wherein using information contained within the signaling message to generate the second LMM filter criteria includes generating criteria for locating a base station system management (BSSMAP) message.

9. The method of claim 1 wherein using information within the matching signaling message to create the second LMM filter criteria includes using a called party telephone number.

10. The method of claim 1 wherein using information within the matching signaling message to create the second LMM filter criteria includes using a calling party telephone number.

11. The method of claim 1 wherein using information contained within the matching signaling message to create the second LMM filter criteria includes using a DTAP called number parameter.

12. The method of claim 1 wherein using information contained within the matching signaling message to create the second LMM filter criteria includes using a signaling connection control part (SCCP) source local reference number (SLRN) parameter.

13. The method of claim 1 wherein using information contained within the matching signaling message to create the second LMM filter criteria includes using an SCCP destination local reference number (DLRN) parameter.

14. The method of claim 1 wherein using information contained within the matching signaling message to create the second LMM filter criteria includes using a transaction capabilities application part (TCAP) transaction ID parameter.

15. The method of claim 1 wherein using information contained within the matching signaling message to create the second LMM filter criteria includes using a mobile subscriber ISDN (MSISDN) parameter.

16. The method of claim 1 wherein using information contained within the matching signaling message to create the second LMM filter criteria includes using an IMSI parameter.

17. The method of claim 1 wherein using information contained within the matching signaling message to create the second LMM filter criteria includes using a temporary mobile subscriber identifier (TMSI) parameter.

18. The method of claim 1 wherein using information contained within the matching signaling message to create the second LMM filter criteria includes using a mobile ID parameter.

19. The method of claim 1 wherein using information contained within the matching signaling message to create the second LMM filter criteria includes using a portion of a called party telephone number.

20. The method of claim 19 comprising using the second filter criteria to locate a subsequent address message (SAM) related to the matching signaling message.

21. The method of claim 1 comprising displaying the call trace sequence via a graphical user interface (GUI).

22. The method of claim 1 wherein specifying a call trace parameter includes obtaining user input information from a graphical user interface (GUI).

23. The method of claim 1 wherein locating a signaling message that matches the first LMM filter criteria includes requiring an exact match between a minimum number of core digits of the first LMM filter criteria and a parameter within the signaling message.

24. The method of claim 23 locating a signaling message that matches the first LMM filter criteria includes:

（a) determining whether the first LMM filter criteria and a first signaling message both include a prefix;

（b) in response to determining that the first LMM filter criteria and the first signaling message both include a prefix, comparing the prefixes;

（c) in response to determining that the prefixes differ, determining that the first signaling message does not match the first LMM filter criteria.

25. The method of claim 23 wherein locating a signaling message that matches the first filter criteria includes:

（a) determining whether the first LMM filter criteria and a first signaling message both include a suffix;

（b) in response to determining that the first LMM filter criteria and the first signaling message both include a suffix, comparing the suffixes;

（c) in response to determining that the suffixes differ, determining that the first signaling message does not match the first LMM filter criteria.

26. The method of claim 1 comprising providing the call trace sequence of signaling messages to a billing process.

27. The method of claim 26 comprising generating a mobile call billing record based on information contained within at least one of the signaling messages in the call trace sequence.

28. A monitoring system including a central processing platform and a plurality of link monitoring modules (LMM) for performing a user specified trace of call signaling messages associated with a mobile communication in a wireless communication network, the system comprising:

（a) a central processing platform adapted to generate signaling message filter criteria based on signaling message information extracted from a mobile call signaling message; and （b) a link monitoring module (LMM) adapted to monitor a signaling communication link, receive the signaling message filter criteria from the central processing platform, identify a monitored signaling message that matches the signaling message filter criteria, and transmit a copy of the matching signaling message to the central processing platform.

29. The monitoring system of claim 28 wherein the central processing platform includes a UNIX-based workstation.

30. The monitoring system of claim 28 wherein the central processing platform includes a graphical user interface (GUI) for receiving call trace request information from a user and for displaying call trace sequence information to the user.

31. The monitoring system of claim 28 wherein the central processing platform includes a correlator process adapted to receive the signaling message information from the LMM unit and subsequently create the signaling message filter criteria.

32. The monitoring system of claim 31 wherein the correlator process includes a filter manager process adapted to distribute the signaling message filter criteria information to one or more LMM units.

33. The monitoring system of claim 32 wherein the filter manager process is adapted to distribute a specific signaling message filter criteria to only those LMM units monitoring signaling links carrying signaling messages formatted in a specified signaling protocol.

34. The monitoring system of claim 33 wherein the central processing platform is adapted to generate direct transfer application part (DTAP) filter criteria.

35. The monitoring system of claim 34 wherein the central processing platform is adapted to generate the DTAP filter criteria based on commands received from a user.

36. The monitoring system of claim 33 wherein the central processing platform is adapted to generate base station system management application part (BSSMAP) filter criteria.

37. The monitoring system of claim 36 wherein the central processing platform is adapted to generate the BSSMAP filter criteria based on parameters in a received DTAP message.

38. The monitoring system of claim 33 wherein the central processing platform is adapted to generate mobile application part (MAP) filter criteria.

39. The monitoring system of claim 36 where the central processing platform is adapted to generate the MAP filter criteria based on parameters in a received DTAP message.

40. The monitoring system of claim 33 wherein the central processing platform is adapted to generate ISDN user part (ISUP) filter criteria.

41. The monitoring system of claim 37 wherein the central processing platform is adapted to generate the ISUP filter criteria based on parameters in a received DTAP message.

42. The monitoring system of claim 28 wherein the LMM unit includes a message buffer for storing monitored signaling messages.

43. The monitoring system of claim 42 wherein the message buffer is implemented in one or more blocks of high-speed random access memory.

44. The monitoring system of claim 42 wherein the LMM unit includes a filter assertion process that is adapted to receive the signaling message filter criteria from the central processing platform.

45. The monitoring system of claim 44 wherein the filter assertion process is adapted to examine the message buffer and identify a signaling message stored therein that matches the filter criteria.

46. The monitoring system of claim 45 wherein the message buffer is adapted to transmit a copy of the matching signaling message to the central processing platform.

47. The monitoring system of claim 28 wherein the central processing platform includes a billing subsystem.

48. The monitoring system of claim 47 wherein the billing subsystem includes a billing record generator process adapted to generate a billing record based on information contained within a sequence of related mobile call signaling messages.

49. The monitoring system of claim 48 wherein the billing subsystem includes a billing rate database adapted to maintain billing rules and communicatively coupled to the billing record generator process.

50. The monitoring system of claim 49 wherein a billing rule associates a billing rate with a signaling message parameter value or range of values.

51. A computer program product comprising computer-executable instructions embodied in a computer-readable medium for performing steps comprising:

(a) generating first filter criteria at a central processing platform and downloading the first filter criteria to a plurality of link monitoring modules;

(b) at a first link monitoring module, receiving a first call signaling message of a first protocol and associated with setup of a mobile telephone call, determining whether the first call signaling message matches the first filter criteria and, in response to determining that the first call signaling message matches the first filter criteria, sending the first call signaling message to the central processing platform;

(c) at the central processing platform, generating second filter criteria for locating a second call signaling message of a second protocol and associated with the setup of the mobile telephone call based on the first call signaling message and downloading the second filter criteria to the link monitoring modules; and (d) at the link monitoring modules, searching for the second call signaling message using the second filter criteria.

52. The computer program product of claim 51 wherein the first protocol is direct transfer application part (DTAP) and the second protocol is mobile application part (MAP).

53. The computer program product of claim 52 wherein the second filter criteria correlate a DTAP called number parameter with a MAP mobile subscriber ISDN (MSISDN) parameter.

54. The computer program product of claim 51 wherein the first protocol is mobile application part (MAP) and the second protocol is and base station system management application protocol (BSSMAP).

55. The computer program product of claim 54 wherein the second filter criteria correlate a MAP international mobile subscriber identification (IMSI) number with a BSSMAP mobile identification parameter.

* * * * *